(12) United States Patent
Raj et al.

(10) Patent No.: US 9,806,810 B2
(45) Date of Patent: Oct. 31, 2017

(54) AUTO-DISCOVERY OF NEIGHBOR RELATIONSHIPS AND LIGHTING INSTALLATION SELF-MAPPING VIA VISUAL LIGHT COMMUNICATION

(71) Applicant: ABL IP HOLDING LLC, Conyers, GA (US)

(72) Inventors: Rashmi K. Raj, Centreville, VA (US); Jason Rogers, Herndon, VA (US); Hampton B. Maher, Washington, DC (US); Sean P. White, Herndon, VA (US)

(73) Assignee: ABL IP HOLDING LLC, Conyers, GA (US)

( * ) Notice: Subject to any disclaimer, the term of this patent is extended or adjusted under 35 U.S.C. 154(b) by 49 days.

(21) Appl. No.: 14/607,590

(22) Filed: Jan. 28, 2015

(65) Prior Publication Data
US 2016/0218804 A1    Jul. 28, 2016

(51) Int. Cl.
*H04B 10/116*    (2013.01)
*H04B 10/114*    (2013.01)
*H04L 29/08*    (2006.01)

(52) U.S. Cl.
CPC ....... *H04B 10/116* (2013.01); *H04B 10/1149* (2013.01); *H04L 67/12* (2013.01)

(58) Field of Classification Search
CPC .......................... H04B 10/1149; H04B 10/116
See application file for complete search history.

(56) References Cited

U.S. PATENT DOCUMENTS

| | | | |
|---|---|---|---|
| 8,755,039 B2 | 6/2014 | Ramer et al. | |
| 9,560,727 B2 | 1/2017 | Reh et al. | |
| 2006/0056855 A1* | 3/2006 | Nakagawa | G09F 9/33 398/183 |
| 2008/0281515 A1* | 11/2008 | Ann | G01C 21/20 701/434 |
| 2010/0201267 A1 | 8/2010 | Bourquin et al. | |
| 2010/0274945 A1 | 10/2010 | Westrick, Jr. et al. | |

(Continued)

FOREIGN PATENT DOCUMENTS

WO    2012137046 A1    10/2012
WO    2014018234 A1    1/2014

OTHER PUBLICATIONS

International Search Report and Written Opinion issued in International Application No. PCT/US15/63404, dated Mar. 2, 2016.

*Primary Examiner* — Nathan Curs
(74) *Attorney, Agent, or Firm* — RatnerPrestia

(57) ABSTRACT

Networked intelligent lighting devices may utilize visual light communication to perform autonomous neighbor discovery, for example, as part of a map generation process. Individually, each intelligent lighting device within an installation transmits a series of packets via visual light communication for receipt by one or more of the other intelligent lighting devices. Receiving intelligent lighting devices record the number of received packets from each transmitter. Records of numbers of received packets are conveyed via a data communication network to a centralized process. The centralized process utilizes the conveyed records to determine neighbor relationships between lighting devices, for example to generate a map of devices as located within the installation.

3 Claims, 11 Drawing Sheets

(56) References Cited

U.S. PATENT DOCUMENTS

| | | |
|---|---|---|
| 2010/0301773 A1 | 12/2010 | Chemel et al. |
| 2011/0176803 A1* | 7/2011 | Song ............... H04B 10/116 398/43 |
| 2013/0297212 A1 | 11/2013 | Ramer et al. |
| 2013/0330088 A1* | 12/2013 | Oshima ............ H04B 10/11 398/130 |
| 2014/0035482 A1 | 2/2014 | Rains, Jr. et al. |
| 2014/0167620 A1 | 6/2014 | Chobot |
| 2014/0167622 A1 | 6/2014 | Chobot et al. |
| 2014/0167623 A1* | 6/2014 | Chobot ............ H05B 37/029 315/158 |
| 2014/0265870 A1* | 9/2014 | Walma ............ H05B 37/0218 315/151 |
| 2014/0354161 A1 | 12/2014 | Aggarwal et al. |
| 2015/0084521 A1 | 3/2015 | Aggarwal et al. |

* cited by examiner

AUTO-DISCOVERY OF NEIGHBOR RELATIONSHIPS AND LIGHTING INSTALLATION SELF-MAPPING VIA VISUAL LIGHT COMMUNICATION

TECHNICAL FIELD

The subject matter of disclosed examples relates to lighting systems with network interconnection of elements, lighting operations of the system, and/or possibly other devices or equipment that may communicate with the lighting devices or via the communications media of the lighting system for other purposes, as well as to auto-discovery and commissioning of one or more elements or devices for communication and operation on the system.

BACKGROUND

Electrical lighting has become commonplace in modern society. Electrical lighting devices are commonly deployed, for example, in homes, buildings or commercial and other enterprise establishments, as well as in various outdoor settings. Even in a relatively small state or country, there may be millions of lighting devices in use.

Traditional lighting devices have tended to be relatively dumb, in that they can be turned ON and OFF, and in some cases may be dimmed, usually in response to user activation of a relatively simple input device. Lighting devices have also been controlled in response to ambient light detectors that turn on a light only when ambient light is at or below a threshold (e.g. as the sun goes down) and in response to occupancy sensors (e.g. to turn on light when a room is occupied and to turn the light off when the room is no longer occupied for some period). Often traditional lighting devices are controlled individually or as relatively small groups at separate locations.

With the advent of modern electronics has come advancement, including advances in the types of light sources as well as advancements in networking and control capabilities of the lighting devices. For example, solid state sources are now becoming a commercially viable alternative to traditional light sources such as incandescent and fluorescent lamps. By nature, solid state light sources such as light emitting diodes (LEDs) are easily controlled by electronic logic circuits or processors. Electronic controls have also been developed for other types of light sources. As increased processing capacity finds its way into the lighting devices, it becomes relatively easy to incorporate associated communications capabilities, e.g. to allow lighting devices to communicate with system control elements and/or with each other. In this way, advanced electronics in the lighting devices as well as the associated control elements have facilitated more sophisticated lighting control algorithms as well as increased networking of lighting devices.

However, deployment of substantial numbers of lighting devices with associated controllers and/or sensors and networking thereof presents increasing challenges for set-up and management of the system elements and network communication elements of the lighting system.

SUMMARY

An example of a method for auto-discovery of neighbor relationships and lighting installation self-mapping via visual light communication includes triggering a general illumination lighting device to modulate a visual light output from a general illumination source of the lighting device to repeat transmission of a packet of predetermined data a number of times. In this example, the predetermined data of the repeatedly transmitted packet includes an identification of the lighting device. The example further includes receiving in a server via a data communication network, from another general illumination lighting device, a report of visual light receptions of the transmitted packet by the other general illumination lighting device. Furthermore, the example includes identifying the lighting devices as neighbors of each other based on detection of a predetermined relationship between the number of times of transmission and the number of visual receptions of the packet of predetermined data.

Additional objects, advantages and novel features of the examples will be set forth in part in the description which follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the Figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The various examples disclosed herein relate to a lighting system utilizing intelligent components and network communications, including techniques for autonomous discovery of a neighbor relationship between devices. Such neighbor discovery, for example, may enable logical and/or physical mapping of device locations for various management purposes and/or support commissioning of various types of elements of such a system for communications and/or logical relationships among such elements. The concepts improve over prior lighting systems, particularly those utilizing networked intelligent lighting devices and other network connected elements. The examples discussed below may also enable autonomous discovery and device commissioning to assist in or perform set-up of such an enhanced network arrangement. Reference now is made in detail to the examples illustrated in the accompanying drawings and discussed below.

Figure 1:
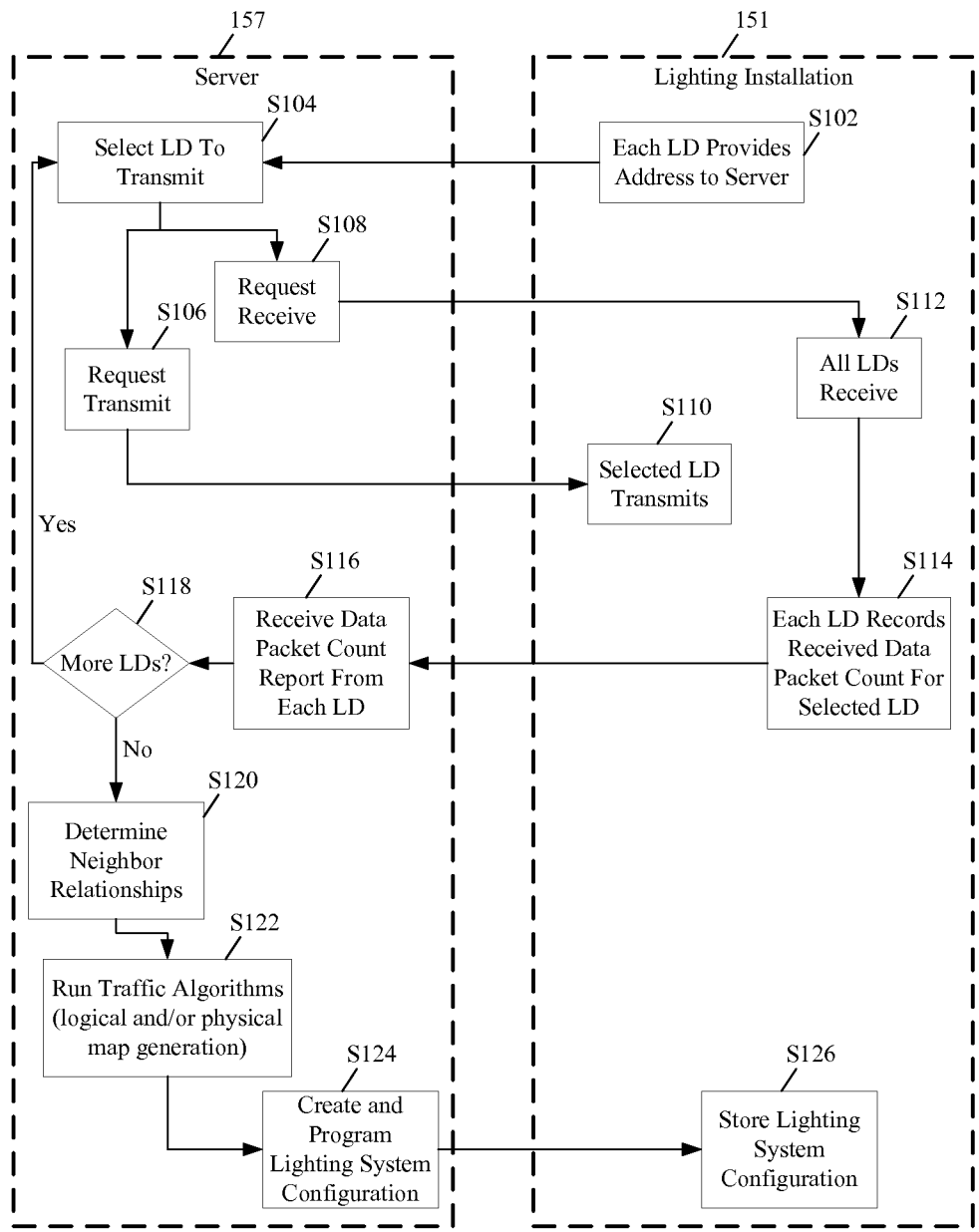
FIG. 1 is a flow chart of an example of a process flow for autonomous neighbor discovery and configuration of a lighting system like that shown in FIG. 2.

FIG. 1 depicts an example of a procedure for commissioning lighting devices. The procedure here involves an exchange of identification and/or other information among lighting devices in order to perform autonomous neighbor discovery. In one example, visual light communication, as described in greater detail below, is utilized to perform the exchange. Information is processed to determine neighbors and then to configure an element (the element performing the self-configuration processing) to set-up one or more logical associations of that element into a group or sub-network (or a plurality of groups or sub-networks) with its neighbors and/or with still other elements of the lighting system.

The discovery and self-commissioning procedure thus utilizes information inherent in or initially known in the element as well as information that is gathered or acquired by the intelligent system element that is performing a discovery and self-commissioning operation like that illustrated in FIG. 1.

Initially, at set-up by the manufacturer before installation of a particular element of the system, any of the intelligent system elements would have certain information pre-stored therein. For example, the element would store its own identification. It would also have stored data so that the 'brain' of the element knows its own inputs and outputs, at least in its initial arrangement as supplied by the manufacturer (e.g. before later additions or modifications at the premises). For example, a lighting device would know the input commands it needs to control its operations as well as the controllable parameters of its light output, e.g. ON/OFF, dimming, color adjustment, etc. If an audio interface is provided, the lighting device would know information as to the microphone and/or speaker and associated signal processing that provide audio input and/or output. If video output is provided in an enhanced light fixture, the lighting device would have stored information about the projector or display device included or to be driven by the fixture. If visible input is provided, the 'brain' of the light fixture would have appropriate information stored in its memory, identifying the camera input of the like and any signaling protocols needed for its interaction with such a component. At least for the autonomous commissioning operations, each intelligent system element would also store information about the element's own capabilities, such as communication capabilities (e.g. hardware interface(s) and protocol(s)), memory capacity, processing capacity.

Device capability information pre-stored in a particular system element may also include information about the element's various modes of operation. For example, for a lighting device, such information may identify a daylight harvesting mode in which a substantial amount of light in a service area is to be provided from outside the area while electric illumination in the area is diminished accordingly, and a regular illumination mode in which most illumination is to be provided by the lighting device (alone or in combination with illumination from other lighting devices illuminating the particular service area).

As part of the commissioning process, each intelligent system element also gathers information from other elements with which it communicates during that process. In one example, at least a portion of the gathered information is received via visual light communication. For discussion purposes at this point, we will describe the other elements communicating with a particular system element during the commissioning process as "neighbors." In particular, in one example, a second lighting device is a neighbor of a first lighting device when, as described in greater detail below, the number of data packets received via visual light communication from the first lighting device by the second lighting device exceeds a threshold. Although the term "neighbor" as used here does not necessarily connote any particular degree of proximity, when used in conjunction with terms such as "near" and "far", a degree of proximity between two neighbors can be illustrated. The information gathered from neighbors includes, for example, identification and capabilities information of each of the other neighbor elements. Depending on the capability of the elements, it may also be able to obtain at least some information as to relative proximity, e.g. based on strength of a communication signal or of a detected light signal.

Some provisioning and/or configuration data may be manually input, under at least some circumstances. However, in the autonomous procedure, the learned data may be obtained from a central repository, e.g. a central overseer function if available and already commissioned, or the learned data may be obtained from communications with the neighbor system elements.

Figure 4:
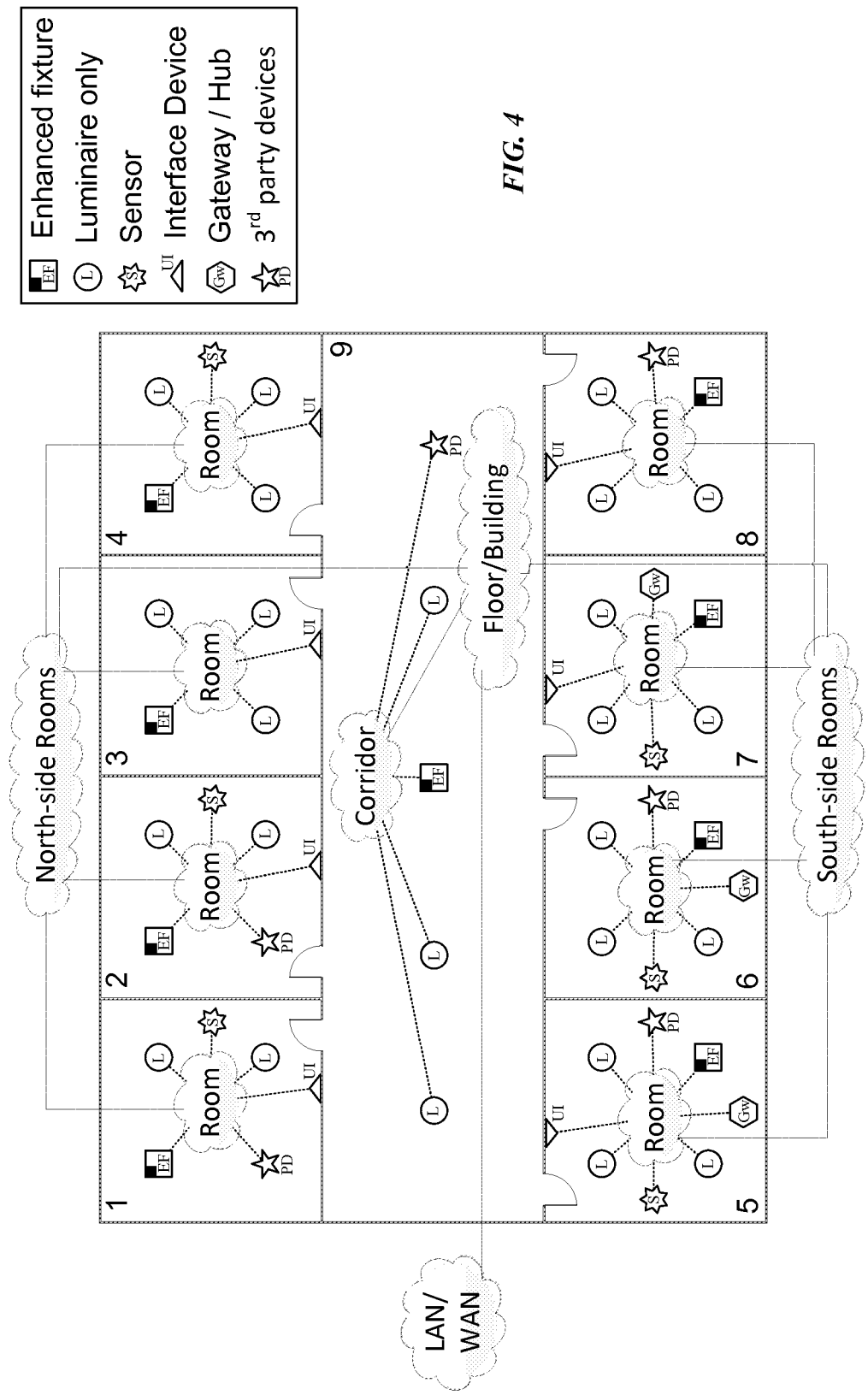
FIG. 4 is a layout diagram of the simple example of a portion of a building with an overlay of lighting system elements, similar to FIG. 3, but showing a first set of logical associations of system elements that may be implemented in a system like that shown in FIG. 2.

With specific reference to the flow chart of FIG. 1, functions performed by a server 157 and elements of a lighting installation 151 are illustrated. In one example, server 157 is a centralized server located on the premises or remotely such as server 53 or CO 57 of FIG. 2. Alternatively, or in addition, the functionality of server 157 is implemented in a distributed or centralized fashion via processing performed by one or more COs and/or elements of the lighting installation 151, such as one or more of the lighting devices. Lighting installation 151 includes, for example, a plurality of lighting devices, such as lighting device 11 of FIG. 2A. In one example, lighting installation 151 represents all lighting devices installed within a system, such as the lighting system of FIG. 2. In an alternate example, lighting installation 151 represents only some subset of lighting devices, such as only those lighting devices installed within a single room, a single area or some combination of rooms and/or areas (e.g., room 1 of FIG. 4 or South-side Rooms as depicted in FIG. 4). Thus, FIG. 1 illustrates an example of a process flow for commissioning and configuration of a lighting system, such as system 10 of FIG. 2, as well as functional relationships between various elements within the system.

The process begins, in step S102, with each lighting device within lighting installation 151 providing a respective address to server 157. As described below, the respective address may be a logical address, such as an IP address assigned to or otherwise configured for use by a lighting device, or a physical address, such as a MAC address uniquely assigned to each communication interface. The delivery of addresses, in one example, is performed via a high data rate or high bandwidth capacity network, such as networks 17A, 17B of FIG. 2. In a further example, address delivery is performed as a result of activation (e.g., powering on) of a lighting device. Alternatively, or in addition, server 157 may poll lighting devices for addresses. In step S104, after receiving all of the addresses, the server 157 selects one of the lighting devices to transmit an identification signal via visual light communication, as described in greater detail below.

In step S106, server 157 requests that the selected lighting device transmit and; in step S108, server 157 requests that all lighting devices, including the transmitting lighting device, receive or otherwise listen for the identification signal via visual light communication. In one example, the request to transmit and the request to receive or otherwise listen are transferred via the high data rate or high bandwidth capacity network. The selected lighting device, in step S110, transmits a respective identification signal. In one example, the identification signal includes an identifier of the lighting device, such as a serial number or other unique identifier as described below. In a further example, transmission of the respective identification signal is performed with visual light communication. Due to various factors, such as relative proximity of a neighbor lighting device to the transmitting lighting device or varying conditions impacting the transmission and/or reflection of light, each receiving lighting device may or may not receive the identification signal. In particular, during a first period of time, one receiving lighting device may receive a transmitted identification signal when, during a second period of time, the one receiving lighting device may not receive the same transmitted identification signal. As such, in order to compensate for possible errors within visual light communication, each respective identification signal is transmitted a predetermined number of times. For example, each selected lighting device transmits their respective identification signal repeatedly some number of times (e.g., 100).

In step S112, all lighting devices, including the transmitting lighting device, receive or otherwise attempt to receive the transmitted identification signal via visual light communication. As described above, some numbers of the lighting devices may or may not receive the transmitted identification signal based on various environmental conditions. Furthermore, any one receiving lighting device may receive all, none or some intermediate number of the repeated transmissions of the identification signal. Hence, in step S114, each receiving lighting device records a received data packet count for the selected lighting device. The received data packet count is, for example, the number of times a receiving lighting device receives the repeatedly transmitted identification signal from a transmitting lighting device. As described below, the steps S106-S114 are repeated for some number of lighting devices within lighting installation 151 but with transmissions/receptions of packets containing respective unique identifications of various different lighting devices. Conversely, receiving devices distinguish received packets based on identifiers of the transmitting devices contained in the packets and can count separately for each sending device. Thus, each lighting device will record a separate received data packet count for each of the transmitting lighting devices.

The collection of received data packet counts recorded by one lighting device is delivered to server 157 as part of a data packet count report. Thus, server 157 receives one data packet count report for each lighting device within lighting installation 151. Each data packet count report includes some number of received data packet counts recorded by the respective lighting device. In a simple example of a simple lighting installation including three lighting devices, each lighting device will record three received data packet counts (i.e., one for each lighting device) and each data packet count report will include three received data packet counts. Therefore, in this simple three lighting device example, server 157 will receive three data packet count reports, one from each of the three lighting devices. In one example, each lighting device compiles their respective data packet count report and delivers the respective report as a single message to server 157. That is, each lighting device only delivers their respective data packet count report to server 157 after all lighting devices have transmitted.

Alternatively, server 157 may compile individual data packet count reports for each of the lighting devices based on individual, or some other number fewer than all, recorded received data packet counts provided to server 157 by the various lighting devices. That is, each lighting device delivers a received data packet count for the selected lighting device to server 157 after the selected lighting device has repeatedly transmitted the respective identification signal. Because one or more receiving lighting devices may receive none of the repeatedly transmitted identification signals from the transmitting lighting device, the respective received data packet count will have a value of zero. In some examples, each data packet count report only includes those received data packet counts that have a non-zero value. In other examples, each data packet count report includes all received data packet counts including counts with a zero value.

In the example of FIG. 1, server 157 compiles each respective data packet count report based on receipt, in step S116, of respective received data packet counts from each lighting device after the selected lighting device has completed transmitting. In step S118, server 157 determines whether there are more lighting devices to be selected. If yes, the process returns to step S104 and the next lighting device to transmit is selected. If no, the process proceeds to step S120.

In step S120, as described in greater detail below in relation to FIG. 8, server 157 determines neighbor relationships between the various lighting devices of lighting installation 151. For example, server 157 determines whether the recorded data packet count received from a first transmitting lighting device by a second receiving lighting device exceeds a threshold. If the received count exceeds the threshold, the second lighting device is a neighbor of the first lighting device. If the received count does not exceed the threshold, the second lighting device is not a neighbor of the first lighting device.

Based on determined neighbor relationships, server 157, in step S122, runs one or more traffic algorithms in order to generate one or more logical and/or physical maps of lighting installation 151. While the total number of lighting devices installed as part of an installation as well as numbers of devices installed within portions of the installation may be easily known, the specific logical and/or physical relationship between particular lighting devices (e.g., device x and device y are physically proximate) may not easily be known without costly and time-consuming manual intervention (e.g., an individual manually walking through a premises and noting physical location of each device). By automating the process of identifying a logical and/or physical location of a particular lighting device within an installation relative to other lighting devices, such costly and time-consuming manual intervention can be reduced or eliminated. As such, a traffic algorithm is, for example, an algorithm that calculates a logical and/or physical location of a lighting device relative to some number of other lighting devices as well as a room or other area within which the lighting devices are installed based on neighbor relationships between the lighting device and the some number of other lighting devices.

Once one or more logical and/or physical maps are generated, server 157 creates and programs, in step s124, a lighting system configuration. The lighting system configuration, as discussed below, provides configuration information to lighting devices and other elements within installation 151 in order to enable proper operation of lighting installation 151. In step S126, lighting installation 151 stores, in one or more of the lighting devices or other elements, lighting system configuration. In this way, configuration and operation of a lighting system, such as system 10 of FIG. 2, can be customized relative to particular elements and corresponding relationships with limited or no manual intervention.

In the example of FIG. 1, server 157 receives various data packet counts from various lighting devices and determines neighbor relationships between the various lighting devices. In an alternate example depicted in FIG. 1A, individual lighting devices collect corresponding data packet counts and create individual neighbor tables. Such individual neighbor tables are, in turn, delivered to server 157 and server 157 utilizes the neighbor tables to validate neighbor relationships and generate one or more logical and/or physical maps of lighting installation 151.

Figure 1A:
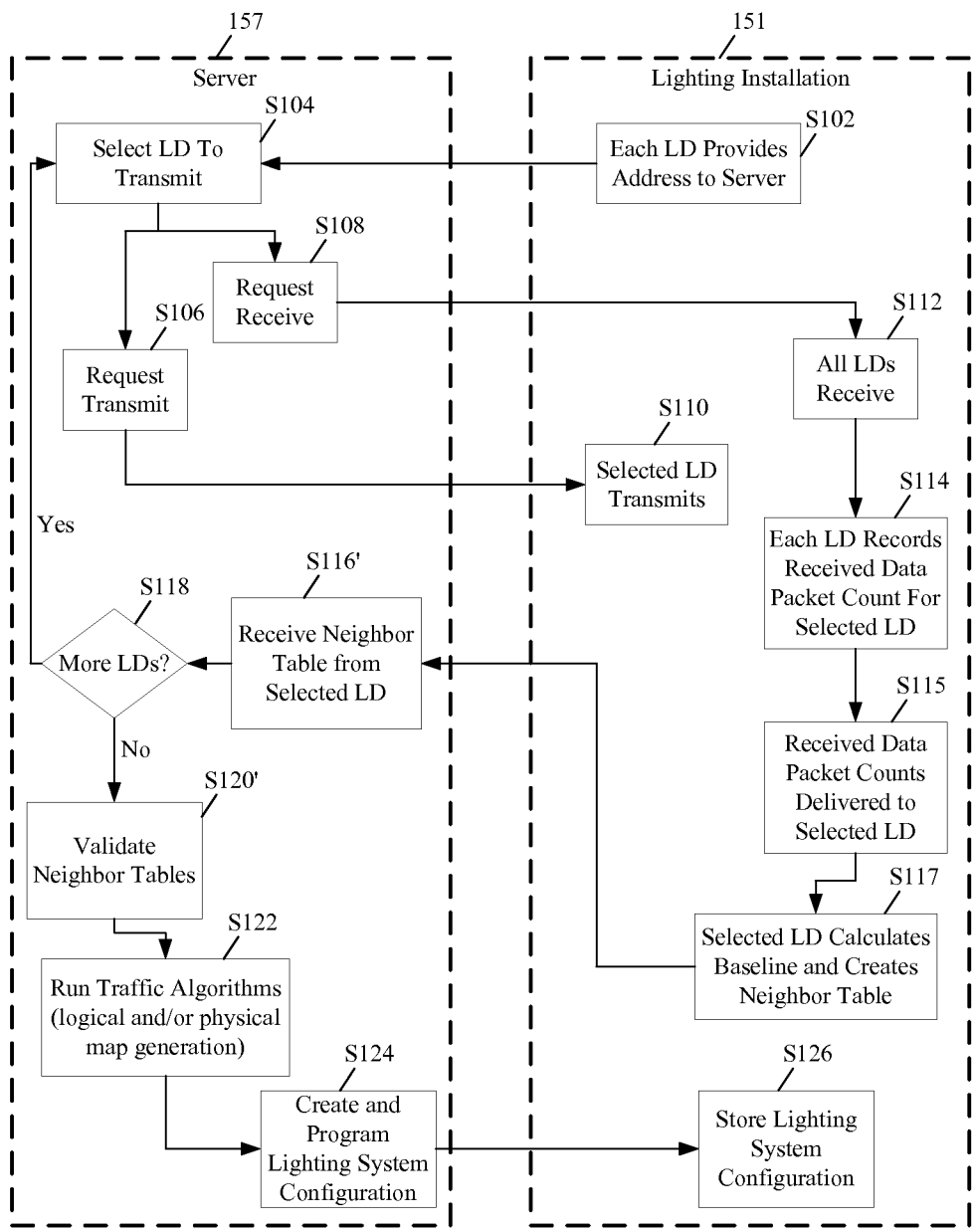
FIG. 1A is a flow chart of an example of another process flow for autonomous neighbor discovery and configuration of a lighting system like that shown in FIG. 2.

More specifically, steps S102-S114, S118 and S122-S126 of FIG. 1A may be similar or identical to steps S102-S114, S118 and S122-S126 of FIG. 1 and need not be described again. Unlike the flow of FIG. 1, however, each receiving lighting device delivers, in step S115, the received data packet count to the transmitting lighting device. Said another way, the transmitting lighting device receives a data packet count from each lighting device which receives its transmission and provides a count of how many data packets the particular receiving lighting device received from the transmitting lighting device.

In step S117, the selected lighting device calculates, for example, a baseline for use in determining which other lighting devices are neighbors of the selected lighting device. Such baseline calculation is described in greater detail below in relation to FIGS. 6-8. As part of step S117, the selected lighting device also creates, for example, a neighbor table indicating which other lighting devices the selected lighting device determines to be neighbors. As described in greater detail below in relation to the examples of FIGS. 6-8, such neighbor determination may be based on the calculated baseline, a selected neighbor threshold and the received data packet counts delivered by the receiving lighting devices to the selected lighting device.

In step S116', server 157 receives the neighbor table from the selected lighting device. The process to this point can be repeated for some or all of the lighting devices at the premises, so that after S118, the server has neighbor tables for the appropriate number of lighting devices. Furthermore, in step S120', server 157 validates, for example, the neighbor tables received from the various lighting devices. As described in greater detail in relation to FIG. 8, such validation, for example, determines whether a first neighbor table for a first lighting device indicates a second lighting device as a neighbor while a second neighbor table for the second lighting device indicates the first lighting device as a neighbor. If too many inconsistencies exist between the various neighbor tables, for example, server 157 may prompt one or more lighting devices to update the neighbor table for the respective lighting devices.

Thus, neighbor discovery in FIG. 1 is performed in a centralized fashion by server 157 while neighbor discovery in FIG. 1A is performed in a distributed fashion by each of the various lighting devices. While FIGS. 1 and 1A have been described as alternative process flows, no such requirement exists. To the contrary, the process flows of FIGS. 1 and 1A are complementary. Lighting installation 151, for example, may contain some number of lighting devices capable of receiving data packet counts from other lighting devices and generating neighbor tables while also containing some number of lighting devices without such capacity. In this example, server 157 receives neighbor tables from those lighting devices capable of generating neighbor tables and server 157 receives data packet count reports from those lighting devices without such capability. In turn, server 157 generates neighbor tables based on the received data packet count reports, validates all of the neighbor tables and generates one or more logical and/or physical maps based on the collection of neighbor tables.

The neighbor discovery as well as the mapping and/or commissioning may be utilized in a variety of different types of lighting systems. Before going into greater detail as to such procedures, however, it may be helpful to first consider an example of an applicable system.

Figure 2:
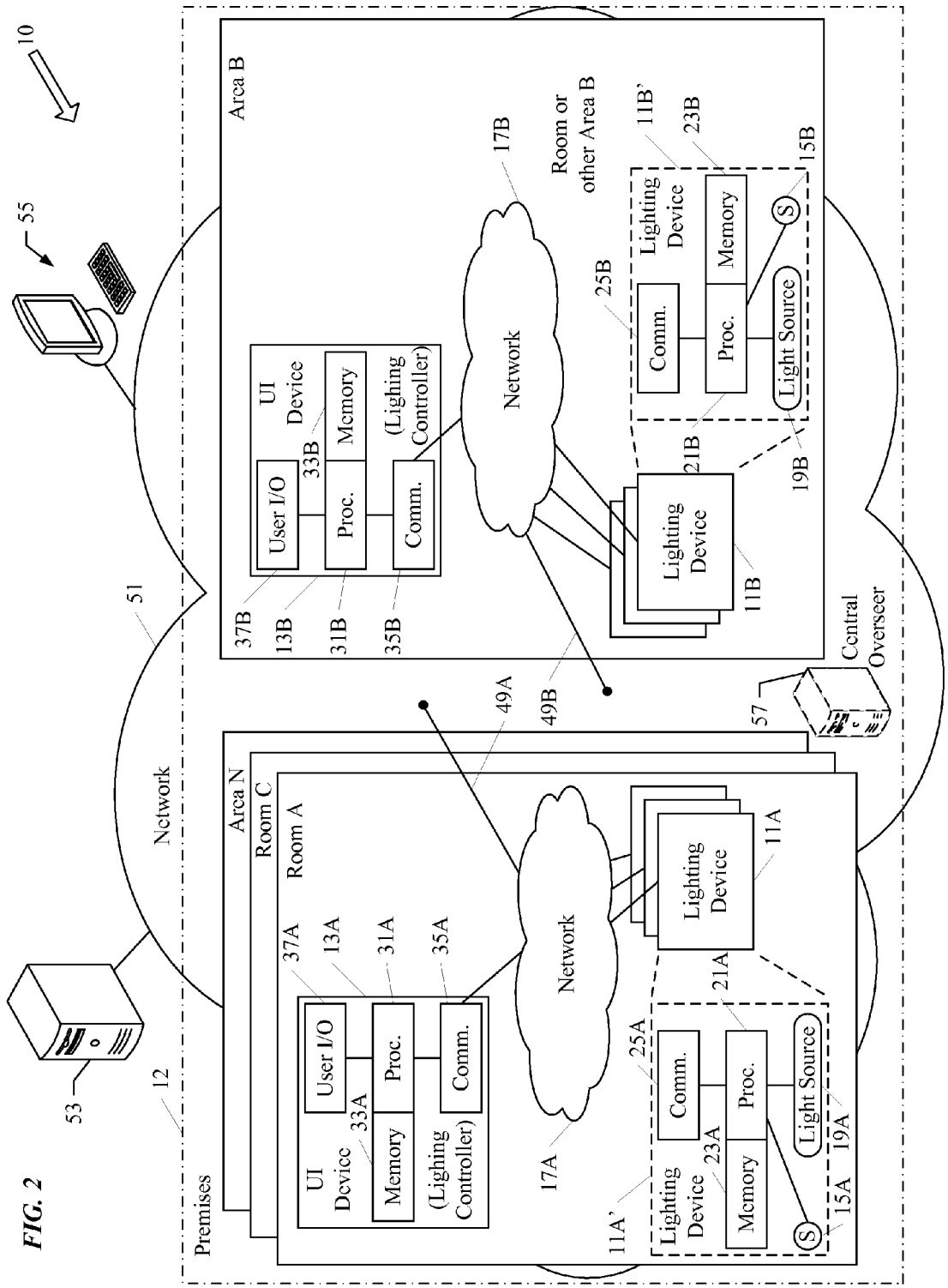
FIG. 2 is a functional block diagram of a simple example of a lighting system having intelligent lighting devices and other intelligent components for lighting related functions and possibly other functions, where the various intelligent system elements are linked or networked for data communications.

FIG. 2 is a high-level block diagram of a networked lighting system 10, many elements of which are installed at a premises 12. The premises 12 may be any location or locations serviced for lighting and other purposes by a networked intelligent lighting system of the type described here. Most of the examples discussed below focus on building installations, for convenience, although the system may be readily adapted to outdoor lighting. Hence, the system 10 example provides lighting and possibly other services in a number of service areas A to N in or associated with a building, represented by room A and room or other service area B, and generally by other room C and service area N. Examples of other types of service areas include a corridor of a building and an outdoor area associated with a building.

The lighting system elements, in a system like system 10 of FIG. 2, may include any number of lighting devices, such as fixtures and lamps, as well as lighting controllers, such as switches, dimmers and smart control panels. The lighting controllers may be implemented by intelligent user interface devices, although intelligent user interface devices on the system 10 may serve other purposes. The lighting system elements may also include one or more sensors used to control lighting functions, such as occupancy sensors, ambient light sensors and light or temperature feedback sensors that detect conditions of or produced by one or more of the lighting devices. The sensors may be implemented in intelligent standalone system elements, or the sensors may be incorporated in intelligent lighting devices, e.g. as an enhanced capability of a lighting device. A system like that shown in the drawing may incorporate or at least provide communication capabilities or services for use by other devices within the premises 12.

Hence, in our example, each room or other type of lighting service area illuminated by the system 10 includes a number of lighting devices as well as one or more other system elements, such as one or more user interface devices each configured as a lighting controller or the like.

As shown, the service area represented by room A in the example includes an appropriate number of first lighting devices 11A, for example, to provide a desired level of lighting for the intended use of the particular space in room A. The equipment in room A also includes a user interface (UI) device, which in this example, serves as a first lighting controller 13A. In a similar fashion, the equipment in room or other service area B in the example includes an appropriate number of second lighting devices 11B, for example, to provide a desired level of lighting for the intended use of the particular space in area B. The equipment in service area B also includes a user interface (UI) device, which in this example, serves as a second lighting controller 13B. Examples of UI devices that may be used are discussed in more detail later.

The equipment in each of the service areas includes one or more sensors. In room A, the sensor 15A is an element of each of the lighting devices 11A. In a similar fashion, in room B, the sensor 15B is an element of each of the lighting devices 11B. Although each lighting device 11A, 11B is depicted with a single sensor, this is only for simplicity and each lighting device 11A, 11B may include one or more sensors. Such sensors may detect a condition that is relevant to lighting operations, such as occupancy, ambient light level or color characteristics of light in an area or level or color of light emitted from one or more of the lighting devices serving the area. Other sensors may detect other conditions that are relevant to other functions of the system or for more general communication about conditions in an area for still further purposes, such as temperature or humidity for HVAC control or vibration for reporting of earthquakes or similar events. Other examples of conditions that may be detected by appropriate sensors include a security condition, an accident/collision detection, an object/occupant identification, etc. Different sensors for different types or sets of conditions may be relevant in different system installations, e.g. some of these examples might be more relevant in warehouse type system applications.

In addition, sensors, such as optical receivers, may be utilized to receive data communicated as part of visual light communication within a system; and we will focus on such optical receiver sensors for purposes of further discussion of FIG. 2.

The lighting devices 11A with sensors 15A and the lighting controller 13A are located for lighting service of the first service area, that is to say, for controlled lighting within room A in the example. Similarly, the lighting devices 11B with sensors 15B and the lighting controller 13B (if provided) are located for lighting service of the second service area, in this case, for controlled lighting within room or other type of area B.

The equipment in room A, in this example, the lighting devices 11A with sensors 15A and the lighting controller 13A, are coupled together for network communication with each other through data communication media generally represented by the cloud in the diagram to form a first physical network 17A. Similarly, the equipment in second area B, in this example, the lighting devices 11B with sensors 15B and the lighting controller 13B, are coupled together for network communication with each other through data communication media generally represented by the cloud in the diagram to form a first physical network 17B. Such network communication via physical networks 17A, 17B typically provides for a high data rate of transferred data and/or a high bandwidth capacity for transferring data.

In a further example, lighting devices 11A are configured to transmit data as part of visual light communication, described in greater detail below in relation to FIG. 2A, and sensors 15A are configured to receive the transmitted data via visual light communication. Similarly, lighting devices 11B are configured to transmit data as part of visual light communication and sensors 15B are configured to receive the transmitted data via visual light communication. In one example, visual light communication provides for a low data rate of transferred data and/or a low bandwidth capacity for transferring data, although visual light communication may also provide a high data rate and/or high bandwidth capacity in other examples. Thus, in this further example, a first high data rate and/or high bandwidth capacity network communication is provided via physical networks 17A, 17B while a second possibly lower data rate and/or lower bandwidth capacity network communication is provided via visual light communication. Alternatively, or in addition, visual light communication, in one example, is utilized to provide both the first high data rate and/or high bandwidth capacity network communication and the second low data rate and/or low bandwidth capacity network communication.

As described in greater detail below, such visual light communication is utilized, for example, as part of autonomous neighbor discovery and logical mapping and/or commissioning of a lighting system, such as system 10. For example, each lighting device 11A transmits a number of data packets via visual light communication. In this example, one or more lighting devices 11A receives some number of the transmitted data packets, via sensors 15A configured as optical receivers, and records the number of received data packets. The recorded number of received data packets is transferred, for example via network 17A, from each recurring lighting device to a centralized process for determining neighbor relationships among lighting devices 11A. Based on determined neighbor relationships, for example, logical mapping of system 10 is performed. Lighting devices also can receive configuration data to commission those devices to operate in a particular manner based on the neighbor relationship. As visual light communication is a central component of the autonomous neighbor discovery and logical mapping under consideration herein, it may be helpful to discuss in further detail an example of a lighting device for transmitting data via visual light communication and a sensor for receiving data transmitted via visual light communication.

Figure 2A:
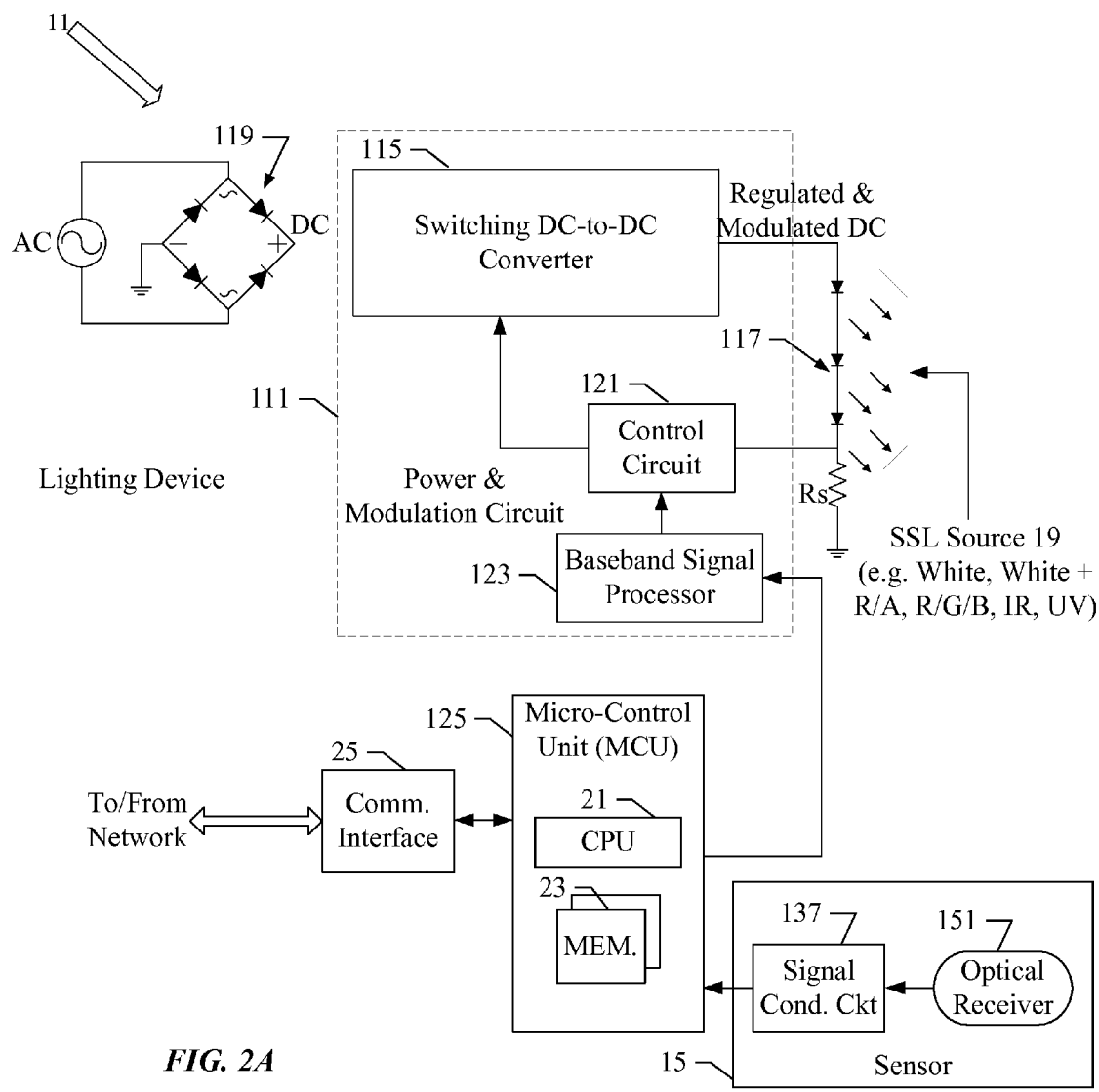
FIG. 2A is a block diagram of a lighting device, as may be found in the lighting system of FIG. 2, including a power and modulation circuit utilizing a power converter.

FIG. 2A is a high-level block diagram that illustrates an example of a lighting device 11 that utilizes a solid state light (SSL) type light source 19 for illumination and operates that source 19 so as to also support light based (optical) communication of data, referred to herein as visual light communication (VLC). Such lighting device 11 may be used as any of the lighting devices 11A, 11B in FIG. 2 as part of the autonomous neighbor discovery and logical mapping or commissioning processes under consideration herein. The lighting device 11 in FIG. 2A includes a power and modulation circuit 111 that both powers the SSL source 19 for regular light output and modulates power so that light output from that source 19 may at times carry data. This data transmission capability supports automatic neighbor discovery and may support other data communication applications. The example of circuit 111 utilizes a switching power converter 115.

As noted, the lighting device 11 utilizes a SSL type of light source 19. Although other types of switchable light sources may be used, particularly other types of solid state light emitter(s), in the illustrated example of device 11, the SSL light emitting source includes some number of (one or more) light emitting diodes (LEDs) 117 that together form the SSL type light source 19.

As discussed herein, applicable solid state light emitting elements that may be used alone or in combination to form the SSL source 19 include any of a wide range of light emitting or generating devices formed from organic or inorganic semiconductor materials. Examples of solid state light emitting elements include semiconductor laser devices and the like. Many common examples of solid state lighting elements, however, are classified as types of "light emitting diodes" or "LEDs." This example class of solid state light emitting devices encompasses any and all types of semiconductor diode devices that are capable of receiving an electrical signal and producing a responsive output of electromagnetic energy in the range encompassing visible light and adjacent regions such as infrared (IR) and ultraviolet (UV). Thus, the term "LED" should be understood to include light emitting diodes of all types, light emitting polymers, organic diodes, and the like. LEDs may be individually packaged, as in the illustrated examples. Of course, LED based devices may be used that include a plurality of LEDs within one package, for example, multi-die LEDs that contain separately controllable red (R), green (G) and blue (B) LEDs within one package. Other examples of LEDs may include some light conversion material, such as a phosphor and/or nanophosphor, to convert light of wavelength(s) emitted by the actual diode to one or more other wavelengths, for example, so that the LED device produces a broadband output that appears pastel or appears white. Those skilled in the art will recognize that "solid state" or "LED" terminology does not restrict the source to any particular type of package for the LED or other solid state emitter. Such terms encompass solid state devices that may be packaged or non-packaged, chip on board LEDs, surface mount LEDs, and any other configuration of the semiconductor emitter device that emits light.

The color or spectral characteristic of light or other electromagnetic radiant energy relates to the frequency and wavelength of the energy and/or to combinations of frequencies/wavelengths contained within the energy. Many of the examples relate to colors of light within the visible portion of the spectrum, although examples also are discussed that utilize or emit light energy in other spectral ranges.

The example of a lighting device 11 shown in FIG. 2A utilizes a group of LEDs 117 as the SSL light source 19 and utilizes a single power converter and modulator circuit 111 to drive that source 19. The LEDs 117 forming the SSL source 19 may be connected in parallel, in series or in series-parallel combinations; although in the illustrated example, the LEDs 117 are connected together in a single series string.

In a typical general lighting application, the LEDs 117 included in the string together produce white light of a desirable color characteristic. For example, the LEDs 117 may all be white (W) LEDs. As an alternate example, configured to produce a somewhat 'warmer' white light, some of the LEDs 117 may be white (W) whereas other LEDs 117 in the string may be another color such as red (R) and/or amber (A). In such white light examples, the LEDs 117 forming the SSL source 19 together provide a broadband visible light output for the general white lighting application, and the circuit 111 supplies driver current and modulates the broadband light output to also carry the data.

The light generation and modulation technologies discussed herein are also applicable to more narrowband carriers produced by relatively monochromatic solid state devices. In a simple example, the lighting device 11 of FIG. 1A might use narrowband LEDs of one color in the SSL source 19, e.g. all red (R), all green (G) or all blue (B).

In most cases, the broadband or narrowband light is in the visible spectrum, however, the present technologies for automatic neighbor discovery and logical mapping and/or commissioning may also be applied in devices that use IR for communication and/or UV (e.g. for communication or to pump phosphor(s) for visible light communication). In a general lighting application where the LEDs do not provide white light (e.g. use R, G, B, UV or IR for data communication), the device 11 could be combined with a separate white light source (not shown) that need not be modulated. Relatively narrowband/'monochromatic' LEDs may utilize the switching circuit type modulation technology better for higher data rates than broadband LEDs. The phosphor in white LEDs might have persistence which could be longer than the time scale at the high data rate; in which case, colored (or narrow-band) LEDs might work better since they do not have phosphor. A modulated narrowband source, however, may still be part of a broadband lighting device. For example, in a tunable red (R), green (G), blue (B) type lighting device that can provide combined tunable white output, the modulated source may be any one of the three (R, G or B) light sources, although only one such source is shown in FIG. 2A. As another example, in a tunable white solid state lighting device, the white channel/source (not shown) may be un-modulated, and another tuning channel may have a narrowband source as shown that is then modulated as discussed herein relative to FIG. 2A.

Returning more specifically to the example of FIG. 2A, the switching power converter 115 has an output connected to supply current to drive the LEDs 117 forming the solid state light emitting source 19 to emit light. The switching power converter 115 has an input coupled to a source of power. The power source could be a direct current (DC) source, such as a battery. In the example, the device 11 obtains power from alternating current (AC) source at normal line voltage (e.g. around 120V in the US). Although not shown, one or more protective fuses may be provided in the line connection(s). The switching power converter 115 connects to the rectified DC output side of a bridge rectifier 119 formed by four bridge connected diodes. Although not shown, some additional smoothing and/or control circuitry may be provided on the power input side, between the bridge rectifier 119 and the switching power converter 115.

The power converter 115 is the switcher of a switched-mode power supply (SMPS) for converting the DC from the bridge rectifier 119 and supplying DC current to the LEDs 117 of the SSL source 19. Hence, the example implements the converter 115 as a DC-to-DC converter. Depending on the application, e.g. the number of LEDs used to provide the desired maximum light output level and the power requirements of that number of LEDs, the power converter 115 may utilize any appropriate power converter topology (e.g. boost, buck, fly back, etc.), albeit configured to operate at a switching rate, as discussed more fully below. In at least some examples, the converter may be a resonant converter.

Although other connection arrangements may be used, in the example, the output of the switching power converter 115 provides the DC voltage and current to the anode side of LEDs 117 in the lighting device 11, to drive the LEDs 117 to emit light at a desired illumination level and modulated to carry data. In the device 11, the power and modulation circuit 111 also includes a control circuit 121 coupled to respond to input data and coupled to the power converter 115, to control at least one parameter of operation of the power converter 115 and thus the current output from the power converter 115 to drive the solid state light emitting source 19, such that light emitted from the solid state light emitting source is modulated to carry the input data.

As used herein direct current or DC refers to current that does not swing between positive and negative (does not pass through 0 or neutral). The output of the bridge rectifier 119, for example, is a half-wave rectified current, and we will consider that DC although there is still extensive variation between peaks and 0. The output of a switcher-based DC-to-DC converter will be relatively constant DC but will still include some ripple. In the device 11 of FIG. 2A, the output of the converter 115 can be considered DC for all intents and purposes (even though it is not the same output as from a battery). The converter output will have a ripple at frequencies. For the data transmission application, the DC output of the converter 115 will also be modulated in one of several ways to carry the data that is being transmitted via the LED light output.

A variety of strategies/technologies may be used to provide the illumination level control as well as the current and light modulation to transmit the data over the output light. The example includes a sense resistor (Rs) in series with the SSL source 19, and the control circuit 121 includes a comparator (not separately shown) to compare an input signal from a baseband signal processor 123 to the voltage across the sense resistor (Rs) to produce an appropriate control voltage as a feedback signal input to the very high frequency switching power converter 115. The baseband signal processor 123 is responsive to input data to provide a baseband signal representing the data as an input to the control circuit. Although separate illumination level control may be provided, in the example the baseband signal processor 123 also adjusts the signal provided to the control circuit 121 so that the switching power converter 115 achieves and maintains an output current level to drive the SSL source 19 to provide the desired overall illumination level as well as to modulate the light output to carry the data. Although other data may be included for transmission (e.g., at other times), for mapping or commissioning, the data includes packets for use in automatic neighbor discovery.

The lighting device 11 may implement a variety of overall host control/operation technologies that provide the high level logic to control operation of the device including data transmission. As lighting devices become increasingly intelligent and 'connected,' such devices utilize ever more sophisticated controllers. The trend in intelligent lighting devices is to utilize programmable processors to implement the host control and communication logic. Although processor based lighting devices may use microprocessors similar to those in computers or mobile devices, the illustrated example of device 11 uses a micro-control unit (MCU) 125, sometimes referred to as a microcontroller.

The MCU 125 implements the control logic for the device 11, that is to say, controls operations of the device 11 based on execution of its embedded 'firmware' instructions. The MCU 125 may be a microchip device that incorporates a processor serving as the programmable central processing unit (CPU) 21 of the MCU and thus of the lighting device 11 as well as one or more memories 23 accessible to the CPU 21. The memory or memories 23 store the executable programming for the CPU 21 as well as data for processing by or resulting from processing of the CPU 21. The memory or memories 23, for example, may store illumination level settings and/or may temporarily store data the device is sending or receiving via VLC. The MCU 125 may be thought of as a small computer or computer like device formed on a single chip. Such devices are often used as the configurable control elements embedded in special purpose devices rather than in a computer or other general purpose device. A variety of PIC16 and PIC32 type MCU chips, for example, may be used as the MCU 125 in the lighting device 11.

The lighting device 11 also includes a communication interface 25 coupled to a communication port of the MCU 125. The interface 25 provides a communication link to a telecommunications network that enables the MCU 125 to send and receive digital data communications through the particular network. The network may be wired (e.g. metallic or optical fiber), wireless (e.g. radio frequency or free space optical) or a combination of such network technologies; and the interface 25 in a particular installation of the device 11 will correspond to the most advantageous network available (based on considerations such as cost and bandwidth) at the location of the installation. For example, if the network is a particular type of local area network (LAN), the communication interface is of a type for linking to and communication through the available type of LAN. The communication interface 25 is therefore accessible by the processor/CPU 21 of the MCU 125, and the communication interface 25 is configured to enable the processor to communicate information about its operations as well as data sent or received as VLC communication through the LAN or other communications network.

Data sent and received via the interface 25 may relate to lighting operations, e.g. to report device status to some other equipment and/or to receive commands and/or setting data to control light output, for example, to turn the light output ON to a particular overall intensity level. In the example, however, the network and the interface 25 also enable the device 11 to receive data for VLC transmission to one or more other devices in the space illuminated by light output from the SSL source 19 in order to facilitate autonomous neighbor discovery. Furthermore, in the example, the network and the interface 25 enable the device 11 to send data regarding received VLC transmissions, such as a count of data packets received from one or more of the other devices.

Although the device 11 could provide one-way data transmission, for purposes of the present example, the device 11 is also capable of receiving data via VLC transmission from a device in the illuminated space. Hence, the device 11 also includes a sensor 15. Such sensor 15 includes, for example, an optical receiver 151 including one or more photodiodes to receive light; and a signal conditioning circuit 137 that processes the receiver output signal to recapture (e.g. demodulate the signal to obtain) data carried on the received light. Such received data is provided to the MCU 125 for processing and forwarding via the interface 25 for communication over the network. In the context of FIG. 2, for example, device 11 may be lighting device 11A, sensor 15 may be sensor 15A, communication interface 25 may be communication interface 25A and the network may be network 17A, while like elements may be similar elements installed within area B of FIG. 2.

Returning now more specifically to the discussion of VLC over-the-air data communication, the device 11 typically receives data for VLC transmission via the network and the communication interface 25 and supplies the data to the MCU 125. The MCU 125 may also generate some signaling data or the like locally for communication via VLC to the other device. The MCU 125 provides level setting commands to the baseband signal processor 123. The MCU 125 may also instruct the baseband signal processor 123 as to the appropriate modulation format, and the MCU 125 supplies the received data to the baseband signal processor 123. The baseband signal processor 123 responds to these inputs from the MCU 125 to generate a signal for input to the control circuit 121. Using the voltage across the sense resistor (Rs), the circuit generates a signal to set the output current from the switching power converter 115 to the intended level for the desired illumination intensity, albeit with the drive current and thus the light output modulated as instructed so as to carry the data over the air. This data flow includes communication of data for automatic neighbor discovery and map support other data transmissions.

In turn, device 11 receives VLC transmissions via optical receiver 151 and passes the received VLC transmissions to signal conditioning circuit 137. Signal conditioning circuit 137 forms the received signal into a more discrete binary format for processing by MCU 125 and supplies the conditioned signal to MCU 125. MCU 125 processes the supplied signal to extract the data transmitted via VLC. In one example, described in greater detail below, such data transmitted via VLC represents an identifier of the other device transmitting the data. In this example, MCU 125 increments a counter indicating the number of data packets received from the other device and stores the received data packet count in memory 23. Such received data packet count facilitates the neighbor discovery under consideration herein.

Returning to the discussion of FIG. 2, many installations will include equipment for providing lighting and other services in a similar manner in other rooms and/or other types of services areas within or on a particular premises 12, such as in a building or on a campus. Although not shown, in similar detail, such other service areas are represented generally by Room C to Area N in the example illustrated in FIG. 2.

The term "lighting device" as used herein is intended to encompass essentially any type of device that processes power to generate light, for example, for illumination of a space intended for use of or occupancy or observation, typically by a living organism that can take advantage of or be affected in some desired manner by the light emitted from the device. However, a lighting device may provide light for use by automated equipment, such as sensors/monitors, robots, etc. that may occupy or observe the illuminated space, instead of or in addition light for an organism. A lighting device, for example, may take the form of a lamp, light fixture or other luminaire that incorporates a source, where the source by itself contains no intelligence or communication capability (e.g. LEDs or the like, or lamp ("regular light bulbs") of any suitable type). Alternatively, a fixture or luminaire may be relatively dumb but include a source device (e.g. a "light bulb") that incorporates the intelligence and communication capabilities discussed herein. In most examples, the lighting device(s) illuminate a service area to a level useful for a human in or passing through the space, e.g. regular illumination of a room or corridor in a building or of an outdoor space such as a street, sidewalk, parking lot or performance venue. However, it is also possible that one or more lighting devices in or on a particular premises 12 served by a system 10 has other lighting purposes, such as signage for an entrance or to indicate an exit. Of course, the lighting devices may be configured for still other purposes, e.g. to benefit human or non-human organisms or to repel or even impair certain organisms or individuals. The actual source in each lighting device may be any type of light emitting unit.

In the examples, the intelligence and communications interface(s) and in some cases the sensors are shown as integrated with the other elements of the lighting device or attached to the fixture or other element that incorporates the light source. However, for some installations, the light source may be attached in such a way that there is some separation between the fixture or other element that incorporates the electronic components that provide the intelligence and communication capabilities and/or any associated sensor.

The example of system 10 utilizes intelligent lighting devices, such as the lighting device 11 of FIG. 2A. Hence, each lighting device has a light source, a processor, a memory, a communication interface, and an optical receiver sensor. By way of an example, one of the lighting devices 11A is shown in expanded block diagram form, as represented by the dashed line box at 11A'. As shown by that expanded example, each device 11A in room A includes a light source 19A, a processor 21A, a memory 23A, a communication interface 25A and a sensor 15A. The drawing also shows one of the lighting devices 11B' in expanded block diagram form. As shown at 11B', each lighting device 11B includes a light source 19B, a processor 21B, a memory 23B, a communication interface 23B and a sensor 15B.

The UI devices serving as the lighting controllers in this example also are implemented as smart/intelligent devices with processing and communication capabilities. Hence, each lighting controller includes a processor, a memory and a communication interface, as well as one or more input and/or output elements for physical user interaction. As shown by way of example, the UI device serving as lighting controller 13A in room A includes a processor 31A, a memory 33A and a communication interface 35A. The UI device serving as lighting controller 13A also includes one or more user input and/or output elements represented generally by user I/O element 37A in the drawing. The element 37A, for example, may include a toggle switch, a rotary controller, one or more sliders, a keypad and/or a touchscreen display. A touchscreen display, for example, may support touch and touch gesture input as well as visual display output. Other examples of the UI input may include a video input and associated processing for gestural control detection, a microphone, an occupancy/motion sensor, proximity sensor, etc. Outputs may be visual, audible, tactile, etc. For example, a microphone and/or speaker may be used to support audible input and/or output, whereas a camera in combination with projector or display may be used to support visual input and/or output. As shown by way of example, the UI device serving as lighting controller 13B in service area B includes a processor 31B, a memory 33B and a communication interface 35B. The UI device serving as lighting controller 13B also includes one or more user input and/or output elements represented generally by user I/O element 37B in the drawing. The element 37B, for example, may be similar to the I/O element 37A in UI device 13A, examples of which were discussed earlier. Of course, other elements may be used to receive input from and/or provide output to a user, in any of the UI devices/controllers 13A, 13B.

The examples focus on neighbor discovery of lighting devices. If extended to UI devices, the UI devices would include light emission and reception elements, similar to those in the lighting devices, although the light transmitter would likely provide much lower power since the UI need not provide general illumination or the like.

Although not shown for convenience, there may be multiple communication interfaces for data communication over multiple media in any one system element (e.g. wider area network over Ethernet and local communication for example on WiFi or Bluetooth or Zigbee or DMX etc.).

Although not shown in FIG. 2, each of the system elements that uses power to operate as described may include a power supply circuit and will connect to or possibly contain a power source. The lighting devices 11A and 11B may draw power from an AC grid or from a DC grid. The lighting devices 11A and 11B, for example, may draw power from alternating current (AC) mains in the building or other type of premises where the system 10 may be installed. In an AC grid type example, the power supply circuit of a particular lighting device 11A or 11B will include a light source driver circuit to process power drawn from the AC mains in any manner as may be appropriate to drive the particular type of light source incorporated in the particular lighting device. The source driver may be a simple switch controlled by the processor, for example, if the source is an incandescent bulb or the like that can be driven directly from the AC current. As another example, the drive circuit may convert AC power to one or more appropriate DC voltage and/or current levels to provide power to DC driven light source(s) such as light emitting diodes (LEDs). The power supply would also process AC power from the mains to provide voltage and/or current levels to power the elements (e.g. processor, memory and interface) serving as the device intelligence and for the communication interface.

In the example, the power supply circuit for each lighting device receives electricity from AC mains, however, one or more of the lighting devices for each service area may be driven by a battery or other power source for a particular application. For example, one or more lighting devices in each room and one or more lighting devices in a corridor each may have or connect to a back-up battery or other back-up power source to supply power for some period of time in the event of an interruption of power from the AC mains.

Other system elements in each service area, such as lighting controllers or other user interface devices would likewise include appropriate power supply circuits, which may rely on AC or DC power from the mains, battery power and/or ambient power harvesting, etc., as needed to operate the components of each respective system element. Examples of ambient power harvesting include vibration responsive power generation, photovoltaics, mechanical work (e.g. EnOcean), etc.

As noted, system elements within a room or other service area are coupled via suitable links for network data communications, as represented generally by the network clouds 17A and 17B. The system 10 also includes communication links coupling the first and second physical networks into a wider area network. The local service area networks 17A, 17B may be relatively distinct from each other and distinct from but coupled to a wider area network as shown generally at 51, or the networks may be relatively unified. Various network media and protocols may be used for the data communications. The networks 17A, 17B allow elements within respective service areas A and B to communicate with each other, and the links or couplings 49A, 49B of those networks to the wider area network 51 allow the elements within each of the service areas to communicate with elements in other service areas and/or to communicate with other devices generally represented by way of example by the server/host computer 53 and the user terminal device 55.

The host computer or server 53 can be any suitable network-connected computer, tablet, mobile device or the like programmed to implement the desired functionalities. Such a device may have any appropriate data communication interface to link to the wider area network 51. If provided, a host or server computer at the premises may utilize the same networking media 17A or 17B and/or 51 utilized by the on-premises system elements.

The user terminal equipment such as that shown at 55 may be implemented with any suitable processing device that can communicate and offer a suitable user interface. The terminal 55, for example, is shown as a desktop computer with a wired link into the wide area network 51. However, other terminal types, such as laptop computers, notebook computers, netbook computers, and smartphones may serve as the user terminal computers. Also, although shown as communicating via a wired link from the wide area network 51, such a device may also or alternatively use wireless or optical media; and such a device may be operated at the premises 12 and utilize the same networking media 17A or 17B utilized by the on-premises system elements.

For various reasons, the communications capabilities provided at the premises 12 may also support communications of the lighting system elements with user terminal devices and/or computers within the premises. The user terminal devices and/or computers within the premises may use communications interfaces and communications protocols of any type(s) compatible with the on-premises networking technology of the system 10. Such communication with a user terminal, for example, may allow a person in one part of the premises 12 to communicate with a system element in another area of the premises 12, to obtain data therefrom and/or to control lighting or other system operations in the other area.

In some examples below, server/host computer 53, user terminal 55 and/or a central overseer functionality described below participate in neighbor discovery and logical mapping of system 10. For example, server/host computer 53 and/or user terminal 55 provides data to lighting devices 11A for transmission via VLC. In turn, lighting devices 11A transfer, for example, recorded received data packet counts to server/host computer 53 and/or user terminal 55. In a further example, server/host computer 53 and/or user terminal 55 utilize the received data packet counts to generate a logical map of system 10 and/or commission lighting devices 11A.

For some lighting system functions discussed more, later, it may be useful to include a central overseer (CO) functionality, in or logically associated with the premises 10. Such a CO functionality provides centralized management of the relevant system functions, for example, to assist in set-up of various logical relationships during provisioning and/or configuration of newly installed or repaired system elements in the various service area(s) of the premises 12. At least some functions of the system 10 may rely on a central controller, for example, to control all lights on a floor or the like under certain conditions (e.g. to turn all lighting except emergency lighting off after hours or to turn on lighting in a manner to lead people to exits in the event of a fire) or to monitor and process all data from sensors of a particular type. Central controller functionalities could be separately implemented, but in the examples are combined with the data management and commissioning assistance functions in one or more COs 57. Hence, the system may include one or more "central overseers", each of which may only contain partial information, information relevant to a specific grouping and/or function. For example, one CO may be set-up as a floor CO, another CO may be set-up as a building CO, etc. Another example, one type of CO (deployed as one or more instances) may serve as a "sensors" overseer that has information about sensors on the system. Likewise, the system could have overseers for "luminaires," "control interfaces," "third party devices," etc. Some installations may also include CO of COs to help with higher level groupings amongst various COs.

The drawing shows a central overseer (CO) 57 in or coupled to the network 51 but generally within the premises 12 (bottom middle of the drawing), by way of an example. If provided as a physical device, such an element may be implemented by appropriate programming of a general purpose computer as a host or server for the particular CO application. The central overseer (CO) functionality, however, may be implemented on a distributed processing basis, either on a number of computers inside or outside of the premises or even as programming executed by processors of some or all of the lighting devices, user interface (UI) devices, sensors, etc. of the system 12, e.g. installed in the various service areas at the premises 12, or combinations thereof. For example, on-site processing capability may be enhanced or redundancy may be built into the system, by utilization of off-site computing resources.

The external elements, represented generally by the server/host computer 53 and the user terminal device 55, that may communicate with the system elements at the premises may be used by various entities and/or for various purposes in relation to the lighting system 10. For example, a terminal such as 55 may allow personnel of an entity that operates the premises to monitor operations of lighting and other systems at the premises and/or make adjustments, remotely.

As another example of use of external communications, a server or a combination of server and terminal device may be operated by a service company, for example, a lighting system service company. Such a service provider may use the external computer equipment 53 and/or 55 to remotely monitor health of the elements of the lighting system 10 at the premises 12 and remotely provide related services to the entity owning or operating the premises, such as troubleshooting, software corrections/upgrades or the like via communication via the Internet or an Intranet with the lighting system on the particular premises. In such an example, the provider's service functionalities may be considered as being out in the 'cloud.'

As shown, the networks and elements of the system 10 in the premises 12 are accessible from the outside, and this accessibility also may make information from within the lighting system at the premises 12 available to outside third parties, e.g. the power company, NOAA, etc. For example, the system can provide sensor data and/or data about operating conditions of various elements at the premises 12 to such third parties.

As will be discussed in more detail later, various circuit elements (e.g. processor devices, memories and associated architectures) may be used to implement the intelligence of the various lighting system elements in the rooms or other services areas. Also, the communications within the rooms and other services areas as well as the communications to and of the wider area network all may use various different types of data networking media and protocols. As a result, various types of one or more communications interfaces may be incorporated into each of the various lighting system elements in the rooms or other service areas and/or remote devices in communication therewith, depending on the particular media and/or protocol to be used in a particular premises or service area thereof.

As shown by the discussion of the components of the system 10 so far, system elements in each service area include intelligence as well as communications capabilities. The precise operations of such a system can be defined by provisioning and/or configuration data stored in and used by the various intelligent system elements. In the examples, provisioning data is data used to set-up or enable operation of a system element so as to communicate via at least a portion of one or more of the networks of the system 10 and through such networking to communicate with some or all of the other elements of the system. In addition to communication via the physical network, elements of the system 10 can be logically associated to form logical groups or logical sub-networks, for a variety of purposes. In the examples, configuration data is data used to establish one or more such logical associations.

As used herein commissioning encompasses various functions to set-up elements of the system for operations. Examples of functions involved in commissioning include provisioning elements for network communications, e.g. for physical communication with other elements via the applicable network media. Provisioning often entails at least some storage of data (sometimes referred to as provisioning data) for use in such communications within each system element. Some provisioning data also may be stored in an element implementing a routing or central network control function, e.g. to facilitate network-side aspects of the physical communications. Examples of functions involved in commissioning also include configuration of system elements to associate elements in one or more logical groupings of 'sub-networks,' to facilitate functional operations of the associated system elements. Configuration also will typically entail storage of data (sometimes referred to as configuration data) in the elements being associated in a particular logical group or sub-network. For example, the data stored in an element may identify one or more logical groupings to which the particular element belongs. Some configuration data also may be stored in an element designated to implement a central overseer type control function. Such commissioning, including aspects of provisioning and configuration of system elements, is based, for example, on neighbor discovery procedures described in greater detail below.

In the example of FIG. 2, provisioning data is stored in the memories 23A of the first lighting devices 11A and the memory 33A of the first lighting controller 13A to enable physical communication among the first lighting devices 11A and the first lighting controller 13A via the network 17A and to enable physical communication of the first lighting devices 11A and the first lighting controller 13A via the wider area network 51. Configuration data is stored in the memories 23A of the first lighting devices 11A and the memory 33A of the first lighting controller 13A for logically associating the first lighting devices 11A and the first lighting controller 13A together to operate as a first area lighting system, in this example, providing lighting service to the room A. Since the sensor 15A is implemented as an element of lighting device 11A', the provisioning and configuration data of that device 11A' facilitate communications via the networks 17A and 51 regarding sensor operations as well as operations of the sensor as part of the first area lighting system.

In a similar fashion, provisioning data also is stored in the memories 23B of the second lighting devices 11B and the memory 33B of the second lighting controller 13B to enable physical communication among the second lighting devices 11B and the second lighting controller 13B via the network 17B and to enable physical communication of the second lighting devices 11B and the second lighting controller 11B via the wider area network 51. Furthermore, configuration data is stored in the memories 23B of the second lighting devices 11B and the memory 33B of the second lighting controller 13B for logically associating the second lighting devices 11B and the second lighting controller 13B together to operate as a second area lighting system, in this example, providing lighting service to the room or other type of service area B.

In addition, configuration data is stored in the memories of at least one of the first lighting devices 11A and the first lighting controller 13A and stored in the memories of at least one of the second lighting devices 11B and the second lighting controller 13B to logically associate the elements storing such data in respective memories together to operate as a system for a predetermined function for both the first area A and the second area B. For example, such configuration data may be stored in the lighting controllers 11A, 11B to group the controllers together, so as to coordinate a lighting status reporting function.

The provisioning and/or configuration data may be stored into the memories of the various system elements via a variety of procedures. For example, one or both types of data may be manually input by a technician with a terminal device, as system installation or as new elements are added to an existing installation. Examples discussed in more detail below rely on more automated commissioning techniques to acquire and store some or all such data that may be useful in setting up the elements to operate as a networked lighting system.

At a high level, a lighting device 11A or 11B may be arranged so as to automatically exchange communications with one or more other lighting devices, to autonomously establish a network arrangement of the respective lighting device with the one or more other lighting devices. In one example, at least some of the automatic exchange of communication utilizes visual light communication. With such an arrangement for automatic neighbor discovery and any associated commissioning, each lighting device will be able to automatically cooperate with the one or more other lighting devices to provide controlled lighting for a service area. For example, once commissioned, the lighting devices 11A cooperate to provide controlled illumination within the room A; and once commissioned, the lighting devices 11B cooperate to provide controlled illumination within the room or other type of service area B. Other elements, such as the user interface devices, in this first example serving as the lighting controllers communicate with lighting devices, etc., to autonomously establish a network arrangement and to establish configuration(s) to enable such other elements to also cooperate in the controlled lighting for each respective service area.

The commissioning communications, to autonomously establish desired communications and cooperative logical relationships, involve one or more procedures to discover neighbor relationships among lighting devices and to establish logical relationships accordingly. A lighting device is a neighbor of another lighting device when, for example, the lighting device receives a sufficient number of data packets from the other lighting device. In a further example, a neighbor relationship exists between the lighting device and the other lighting device when both the lighting device is a neighbor of the other lighting device and the other lighting device is a neighbor of the lighting device. Thus, in the examples discussed below, such discovery relates to autonomously identifying neighboring devices and determining whether a neighbor relationship exists between two lighting devices within an installation. In various examples described in greater detail below, visual light communication is utilized to perform auto-discovery of neighbor relationships and lighting installation self-mapping.

For example, the function to automatically exchange communications with one or more other lighting devices implemented by a respective lighting device may involve sending a signal identifying the respective lighting device for possible reception by each of the other lighting devices. In one example, such signal is transmitted via VLC. A first lighting device 11A, for example, transmits a number of data packets identifying the first lighting device and one or more other lighting devices 11A attempt to receive the first transmitted data packets. Similarly, a second lighting device 11A transmits a number of data packets identifying the second lighting device and one or more other lighting devices 11A attempt to receive the second transmitted data packets. Transmission of some number of identifying data packets is repeated, for example, by each of the lighting devices 11A.

In the one example, the identifying data packets transmitted via VLC are received via a sensor, such as optical receiver 15 of FIG. 2A. In a further example, the one or more receiving lighting devices 11A utilize optical receiver 151 to receive none, one, some number or all of the transmitted identifying data packets of a transmitting lighting device. In turn, each of the one or more receiving lighting devices 11A record one or more counts of transmitted identifying data packets received via the corresponding optical receiver 151 (e.g., a first received data packet count for the first number of transmitted data packets from a first transmitting device, a second received data packet count for the second number of transmitted data packets from a second transmitting device, etc.). Each received data packet count can be compiled in a list, table or the like in memory, to effectively store each count of received identification of another of the lighting devices. Each such compiled list, table or the like can further be transferred, for example, via networks 17A, 17B and/or 51 to a CO 57, server 53, terminal 55 and/or some other server, terminal or distributed processing function for subsequent processing. Subsequent processing may include determining neighbor relationships, running traffic algorithms to generate a map, and creating and programming a lighting system configuration for transfer back to and storage in the lighting devices, as described in greater detail below.

As noted earlier, the elements of the system 10 can communicate via networks 17A, 17B and 51 with various devices outside the premises, for a variety of purposes. For example, a lighting system vendor or other service provider may operate one or more servers 53 and/or terminal devices 55 to remotely monitor and service the elements of lighting system 10 at the premises. As the lighting devices become more intelligent, they require a different level or type of ongoing maintenance. The LEDs in many modern fixtures or lightbulbs, for example, may last a long time without needing the traditional bulb replacement of older fixtures. However, the programmable processors and memories in the associated control and communication equipment are essentially information technology (IT) resources that require IT type service, e.g. configuration and software/firmware management. The networking of the lighting elements together with associated communication with outside network(s) 51 allows the enterprise or a third party service provider to perform the IT type maintenance on the lighting system equipment remotely from a server 53 or from a remote user terminal device 55. For example, a vendor that sells the lighting devices, controllers, sensors and associated networking gear may offer a maintenance service, to remotely monitor and manage at least the elements of lighting system. For example, if issues arise with provisioning or configuration during self-commissioning, the vendor can provide remote assistance. Neighbor discovery at installation and updated discovery (e.g., when there are building or system changes) can help facilitate such assistance.

Light fixtures, and in many case, other types of lighting devices, remain in use for many years, e.g. 10, 20 or more years. Physical aspects of such devices may remain unchanged for the useful lifetime of the lighting devices without physical upgrade. At most, a source such as a lightbulb may be replaced when it wears out, but the rest of the device remains in operation. In the paradigm of the disclosed system of networked intelligent lighting devices, the software/firmware programming and configuration data can be changed from time to time, e.g. to upgrade or add functionality, to accommodate new lighting devices or other equipment as may be added to the system from time to time, etc.

The intelligence (processing and associated memory capacities) for the system is spread among many different elements in the system. As a result, the degree of intelligence in any one device/element need not be that complex; and alternatively, a central intelligent functionality such as a server or host computer may or may not be necessary. Individual lighting devices therefore need not be too complex or expensive, and in at least some installations, there is no need for additional expensive computer or software for a central intelligent control functionality.

The lighting device will include a 'brain' or central processing unit (CPU) component, which essentially includes the processor and memory (see examples in FIG. 2). Although not separately shown in FIG. 2, the lighting device also may include one or more standard connectors for coupling of other components to the 'brain' of the device. The CPU component may include the one or more communications interfaces, or the communications interface(s) may be provided via a separate component/board/module. If built on a personal computer like design, for example, a light fixture might include one mother board that has the CPU circuitry, an Ethernet port, a WiFi transceiver and one or more USB ports and a coupling to connect to a standard light driver. However, each lighting device (e.g. enhanced fixture or luminaire in our examples) could utilize the same mother board, although different implementations/product offerings could incorporate different light sources coupled to the light driver port and/or different enhancements (e.g. sensors, or input/output devices coupled to the USB port(s)).

As products sold to customers, the lighting equipment manufacturer could offer a range of lighting devices with a wide range of capabilities at various price points. However, across such products, many elements of the devices, including the 'brain' and the communications elements and other interfaces, would be essentially the same. Interfaces configured for standardized modular plug-in coupling could be provided in such devices to facilitate easy addition of various enhancements, such as sensors, input and/or output devices (e.g. for audio and/or video), extra memory, extra processor(s), additional communication components, etc. Plug-in here may utilize a physical and electrical connection or utilize some other type of coupling, e.g. capacitive or inductive. Any plug-in module that may require the 'brain' of the device to run additional programming for the device to be able to utilize or work with the plug-in module could have the requisite programming stored in memory in the module. In such a case, the 'brain' of the device and the module would be configured to upload the requisite programming form the memory of the plug-in module to the memory of the device, when the module is installed in the device. Alternatively, installation of the plug-in module could cause the processor of the device to communicate via network with an appropriate server to obtain any programming that may be required for proper device operation with the newly installed module.

A PC based approach may be based on any microprocessor architecture such as a Reduced instruction set computing (RISC) using an ARM architecture, as commonly used today in mobile devices and other portable electronic devices, or a microprocessor architecture more commonly used in computers such as an instruction set architecture (ISA), like those used in Intel microprocessors and the like.

The PC-like or other microprocessor based approaches are discussed by way of examples; and other processor implementations may be used, such as based on a Peripheral Interface Controller (PIC) or other microcontroller architecture. Alternative intelligent architectures for the intelligence of the devices, however, will still include appropriate communication interfaces and couplings for light sources and may include other standardized ports for connections of sensors, user input/output devices, etc.

The neighbor discovery, mapping and/or commissioning processes outlined herein can serve both to provision elements of the lighting system 10 for communications via the relevant network media at the premises 12 as well as to define logical associations into groupings or sub-networks for purposes of coordinated functional operations within the system 10. It may be helpful to consider some examples of physical networking and logical associations, which can be configured in a system like that of FIG. 2 via utilization of visual light communication to facilitate auto-discovery of neighbor relationships and lighting installation self-mapping.

Figure 3:
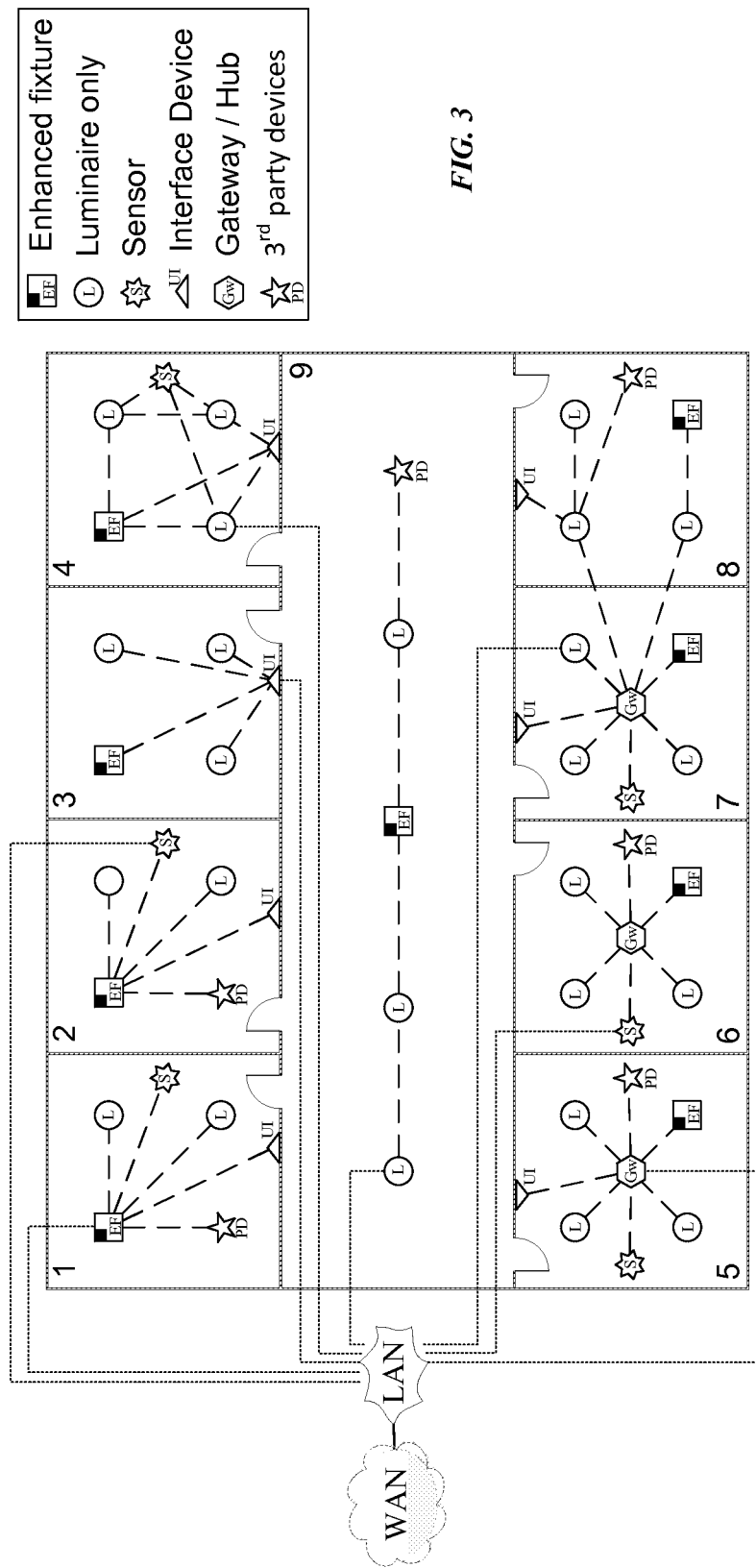
FIG. 3 is a layout diagram, for a simple example of a portion of a building with an overlay of lighting system elements, useful in explaining various examples of physical network configurations that may be implemented in a system like that shown in FIG. 1.

FIG. 3 shows a simple layout of a building or a portion of a building with a network system of lighting devices and related equipment installed therein, similar to that discussed above relative to FIG. 2. For purposes of illustration and discussion here, the building includes eight rooms along one long corridor. However, it should be readily apparent that the system under discussion here can be easily adapted to indoor installations with fewer or more rooms, more corridors, multiple floors, multiple buildings or to outdoor installations alone or in combination with in-building installations.

For discussion purposes, different rooms are shown with different networking arrangements of the various interconnected elements. However, it should be readily apparent that the system may use the same networking arrangement in several or all rooms/corridors or may use still other networking arrangements instead of or in addition to the illustrated examples.

This first layout drawing is intended to illustrate aspects of examples of the physical networking of lighting, communication and other elements of a system, as may be deployed in a building in this example. Hence, this first layout diagram illustrates a number of different examples of the physical networking of various system components throughout the building. Different logical relationships that may be established based on neighbor discovery and logical mapping and/or commissioning will be discussed later, with reference to other illustrative drawings.

For convenience, various system elements are represented by graphic symbols, as shown by the legend in the drawing. For example, a rectangle with a shaded section in the upper right corner represents a lighting fixture with one or more enhanced capabilities, or "enhanced fixture" (EF). Examples of enhanced capabilities may include increased memory, faster processor, a user interface component (e.g. gestural control sensor, microphone/speaker, video camera/projector, information display, etc.) and/or an integrated sensor for sensing a condition in relation to a lighting function or a condition for some other purpose not directly related to lighting or lighting control. Luminaires are represented by circles (L). Luminaires in this example are lighting fixtures or lamps that perform normal lighting functions but do not have the added capabilities of the enhanced fixtures. For neighbor discovery and associated mapping and/or commissioning, enhanced fixtures (EF) and luminaires (L) will include light modulation elements and optical sensors for VLC, e.g. similar to those discussed above relative to FIG. 1A.

Standalone sensors (S) are represented by seven-pointed stars. The sensors may be of types that sense conditions directly related to lighting, such as lighting device output, ambient light or occupancy. However, as an alternative, any sensor represented by a seven-pointed star may be configured to detect some other type of condition that is not necessarily involved in lighting operations, such as sound, atmospheric conditions (e.g. temperature or humidity), vibration, etc. Other types of sensing for lighting control or other system functions include audio input, video input, electrical load sensing, etc.

In the drawing, each triangle symbol represents a user interface (UI) device. For lighting purposes, such devices are often referred to as lighting controllers. Examples of lighting controllers include ON/OFF switches and dimmers. For systems using more advanced lighting devices, user interface devices serving as the lighting controllers may also provide a mechanism for color selection of the lighting output(s). In a system such as that illustrated in the drawings, the user interfaces may provide input (and output) for the user in any convenient or desirable form, in relation to the lighting functions, in relation to other functions monitored or controlled via the system (e.g. HVAC and/or any industrial/commercial equipment running on the premises) and possibly for access to external information and/or controllable resources via the Internet. Advanced examples of user interfaces include touchscreen display devices as well as audio input/output devices, various other video input/output device; gestural input devices, etc.

All of the system elements in the rooms or areas of the premises, coupled together into the lighting system and network, have at least some communication capability. For example, some number of such devices communicate with each other via local physical network communication links. Some of the system elements may serve as a hub for communication with some or all of the other devices. Also, as will be discussed in more detail below, in some rooms in our example, one or more of the fixtures, luminaires, user interfaces, or other elements in a particular room or service area also provide communications outside of the room or service area.

Selection of the element in an area that will provide the network connectivity to the LAN may be based on selection criteria as part of the logical mapping and/or commissioning of the equipment in a particular service area. For example, if only one element in a room or the like has the actual connectivity, that element is chosen by the other devices to provide the routing function. However, if two or more elements have the capability, one may be initially selected (for any appropriate reason), but then the other element takes over the routing function, for example, in the event that the first element may later fail, or be overloaded, busy, etc., or if the communication to/through the other element is better at a particular later time.

Alternatively, the equipment in a particular room or service area may include a gateway (Gw) hub, represented by a six-sided polygon (see legend) in the drawing. The gateway hub in this later type of example is a device that provides communications capabilities and is not itself configured as a device of one of the other types. A gateway hub may support communications capabilities to and from some or all of the other devices within the room or service area. In some examples, one of the other elements in the room or service area may support the communication outside the room or area. In other arrangements, the hub gateway provides the external network communications capabilities, although in some cases is does support the local intra device communications whereas in other examples the hub gateway does not support the local intra device communications. A gateway hub might also support other, non-lighting capabilities (e.g. memory, processing power, etc.).

The layout drawing of FIG. 3 also shows several other types of devices, represented by five-pointed stars and generally referred to as third party devices "PD" (see legend). These PD devices represent a general class of a wide range of other devices that may use the lighting system for communication purposes and may interact with elements of the lighting system. In some cases, these devices may themselves be 'lighting' related, such as lighting controllers, but manufactured by parties other than the vendor that manufactures the overall system and most of the components thereof. As another example, these devices may be controlled devices and/or user interfaces or controllers for other types of equipment, e.g. HVAC and/or any industrial/commercial equipment running on the premises, whether or not manufactured by parties other than the vendor that manufactures the overall system and most of the components thereof. As still further examples, the PD devices may be security system devices, building access control device, inventory control monitors, location/positioning devices (e.g. indoor "GPS") or any device using the lighting network as a communication backbone.

The drawing of FIG. 3 shows different physical network configurations for purposes of discussion. In many examples, similar areas or rooms (and possibly all areas of a premises) may utilize the same network configuration. The particular configuration used in common for some or all of the areas may be one of those shown or still a different configuration. The configuration used for a particular premises and/or a particular area of a premises can be selected based on cost and performance metrics of the entity that will utilize the premises, on cost and performance metrics of the entity (e.g. lighting vendor) that will install and maintain the system, or other reasons of one or more of the involved parties.

The equipment in the service areas represented by the various rooms 1-8 and any other lighting system service areas, such as the corridor 9, connect together with and through a communication network in the premises. In the example, the communication network in the premises takes the form of a local area network (LAN).

The drawing shows data communication links within a room or other service area as long-dashed lines and shows data communication links from the elements in the various network rooms or other service areas out to wider network (s) as lines with small dots. Both types of network links may utilize any convenient data communication media, such as power lines wiring, separate wiring such as coax or Ethernet cable, optical fiber or wireless (e.g. Bluetooth or WiFi). Some or all of the network communication media may be used by or made available for communications of other gear, equipment or systems within the premises. For example, if combinations of WiFi and wired or fiber Ethernet are used for the lighting system communications, the WiFi and Ethernet may also support communications for various computer and/or user terminal devices that the occupant(s) may want to use in the premises. The data communications media may be installed at the time as part of installation of the lighting system or may already be present from an earlier data communication installation. Although available for other communication purposes, these network communication facilities carry information between a central process involved in neighbor discovery and the various lighting devices (see also FIG. 2).

Within one room or other type of service area, the system might use one, two or more types of communication media. Similarly, to interconnect equipment in various rooms or areas and in turn connect such elements into a broader network, the system may use one, two or more types of communication media. Use of multiple communication media, for example, might help to optimize bandwidth throughput, cost and/or security. As a more specific example, an application or function needing low latency communication between devices that are physically close may use one media for the local connection, but one of the devices at other times may need to send large amounts of data to a remote location for processing via a different wide-area media with faster data transport capabilities. As a further example, physically close enhanced fixtures and luminaires may utilize visual light communication to transmit and receive data as part of autonomous neighbor discovery.

Also, in most of the examples the elements of one room may be networked together and connected to the broader area network, however, in some examples at least, it may be more effective to connect the elements in two or more rooms together and provide a connection thereof to the broader area network.

In the example shown, room number 1 includes an enhanced light fixture, two luminaires, a sensor (as a standalone device), a user interface device and a third party device. Each luminaire, sensor, interface device and third party device has a communication link within the room 1 to the enhanced light fixture. In such a configuration, to the extent that the luminaires, sensor, interface device and third party device communicate with each other within the room 1, the inter-device communications within the room go through the enhanced light fixture. The enhanced light fixture also communicates with the luminaires, sensor, interface device and third party device within the room 1 over the illustrated data communication links. In the configuration example shown in room 1, the enhanced light fixture also couples to a link of/to the LAN, to enable the various devices in room 1 to communicate with other devices of the system and with outside networks, via the LAN.

Room 2 in the drawing includes elements similar to those in room 1. Physical networking for communications between the devices in room 2 is also similar to that implemented in room 1. Hence, the example of room 2 shows communications of the luminaires, sensor, interface device and third party device within the room 2 with the enhanced light fixture and, through the fixture, communicating with each other. However, system elements other than the enhanced light fixture can provide the communications with the broader area network. In the example of room 2, the sensor is configured to provide a coupling to a communication link to the broader area network provided by the LAN. The other type of system element providing the coupling to the LAN may be a luminaire, a sensor, an interface device or a third party device or a gateway device.

In the example shown, room number 3 includes an enhanced light fixture, three luminaires and a user interface device. In this example, the luminaires and the enhanced light fixture communicate over the in-room media with the user interface device, and through that device, communicate with each other. The user interface device in this example provides a coupling to a communication link to the broader area network provided by the LAN.

The example of room 4 includes an enhanced light fixture, three luminaires, a standalone sensor and a user interface device. The elements in room 4 communicate with each other via a mesh network arrangement. As represented by the dashed lines in room 4, each of the devices in that room communicates directly with one or more of the other devices in that room. One of the devices in the room is able to connect to the broader area networks, in the example, to the LAN. By way of a specific example, in room 4, the coupling to the LAN is through a normal luminaire L.

In the room examples discussed so far, one of the devices provided for normal purposes in each room (e.g. any one of an enhanced light fixture, a luminaire, a sensor, a user interface device, or a third party device, in any room) provided the coupling to a link to the LAN. However, in other arrangements, such devices may not fully support all of the desired communications. Hence, a hub gateway device may be added, to support inter-device communications within a room or area and/or to provide a coupling to a communication link to the LAN (and/or to a WAN). Rooms 5-7 show several examples of room or area configurations that utilize such a gateway hub.

Room 5 includes a third party device, a user interface device, a sensor, three luminaires and an enhanced light fixture. In addition, room 5 includes a hub gateway. In this first hub-based example, the other elements in room 5 all communicate with the hub gateway element, and through that element, communicate with each other. As such, the networking in room 5 forms sort of a star network, with the hub gateway at the center of the star. Of course, other physical networking arrangements may be used for the communications of the hub gateway with the other system elements in the room. In the networking arrangement shown in room 5, the hub gateway also provides a coupling to a communication link to the LAN.

Room 6 similarly includes a third party device, a sensor, three luminaires and an enhanced light fixture; and the room includes a hub gateway to facilitate communications. In the example of room 6, the hub gateway supports communications among the various system elements within the room. The other elements in room 6 all communicate with the hub gateway element, and through that element, communicate with each other. Although other network media connection or coupling arrangements may be used; in the example, the networking in room 6 forms sort of a star network, with the hub gateway at the center of the star. As noted in earlier discussions, any of the elements, such as the enhanced fixture, a luminaire, the sensor, a user interface device or a third party device may be configured and linked to support the communications of the elements in a particular room or service area with one or more broader area networks, such as the LAN in our example. In the configuration shown in room 5, the sensor is configured to provide a coupling to a communication link to the broader area network provided by the LAN.

As noted earlier, rather than system elements in each room connecting only to each other and having a coupling or link for the room to the LAN; another approach is to have elements in or associated with two or more rooms or lighting service areas connected together into a somewhat larger local network with one coupling thereof to the broader area network, in our example, the network forming the LAN. This point is illustrated by rooms 7 and 8 in the example of FIG. 3. Room 7 includes a user interface device, a sensor, three luminaires and an enhanced light fixture; and the room includes a hub gateway to facilitate communications. In the example, the networking in room 7 forms sort of a star network, with the hub gateway at the center of the star, although other arrangements may be used. The other elements in room 7 all communicate with the hub gateway element, and through that element, communicate with each other.

Room 8 similarly includes a third party device, a user interface device, three luminaires and an enhanced light fixture. Various techniques may be used to network the elements in room 8 to the elements in room 7, for communication purposes. In the example, two of the luminaires in room 8 have respective links to the hub gateway in room 7. Other elements in the room 8 communicate through those luminaires with the gateway in room 7. Such an arrangement of communication links allows the various system elements in room 8 to communicate with each other as well as with the elements in room 7 and with the LAN.

The layout drawing illustrates communications networking. Power circuitry may be configured differently. For example, several offices may be on the same network, such as shown in rooms 7 and 8. However, the power and logical control for lighting and the like may be separate, as represented by the lighting control functions offered by the user interface devices in the two individual rooms 7 and 8. Stated another way, although linked for communications, a user in room 7 could operate the interface in that room to turn ON/OFF, dim or otherwise adjust the lighting in that room, independently of control of similar or other control of lighting or other functions in the room 8 by a user in room 8 operating the interface in room 8. Examples of such multi-space arrangements include different cubicles in an otherwise open office space, where the individual controls allow occupants some degree of individual control over conditions in their cube as well as a re-configurable conference room that may be configured as one large conference room or divided by retractable divider walls to form two or more smaller conference rooms.

The drawing also shows an example of a physical network configuration for a somewhat different type of space serviced by the lighting system/network. In the example, the additional or different type of space is a hallway or other type of corridor 9. Various devices may be provided in the corridor 9, for lighting and other purposes, which also use the communications provided with the lighting system. In the simple example shown in the drawing, the corridor 9 includes three luminaires, an enhanced light fixture and a third party device. Again, various physical media and communication configurations may be used for the networking in the corridor 9. For an elongated corridor like that in the illustrated example, it may be most efficient to connect each device to the next device down the corridor, in a fashion that appears somewhat serial in the drawing, although the network connectivity provided through the devices may or may not be serial. One approach, for example, might implement a daisy chain arrangement, whereas another approach might rely on internal connectivity between ports on various system elements in the corridor 9 to combine the links to form a bus; and still other networking configurations might be used even with the device-to-device arrangement shown in corridor 9. The end device in the corridor, such as one of the luminaires in the specific example depicted in corridor 9, provides a coupling to a communication link to the broader area network provided by the LAN. Such an arrangement of communication links allows the various system elements in corridor 9 to communicate with each other as well as with the elements in room 7 and with the LAN.

As outlined earlier, the various links may be wired, optical fiber, radio wireless, or optical wireless or any other suitable communications media (e.g. audio). Mesh implementations like that in room 4 involve communication of each element on the mesh network with other elements (potentially with all other elements) within the mesh. Whereas star configurations as shown in other rooms involve communication through a hub or other element configured as a router or the like. Even in the mesh configuration, however, one of the elements may be configured as a data switch or router for communication with/via the LAN. As shown by the various examples, however, various elements of the lighting system that serve other system purposes may serve as the router or switch for LAN connection and/or as a router within a room or area network; or a hub gateway may be included within a room or other service area of the system to perform any routing of data switching functions needed to support a particular chosen or optimum physical network configuration for a particular premises or portion thereof.

In a wireless arrangement, e.g. using WiFi within a room or area, the hub gateway or other element serving as the router may take the form of or include a wireless access point with associated Ethernet connectivity to the LAN with an appropriate integrated router functionality. Where wired Ethernet is used for the connectivity within a room or other service area, the hub gateway or other element serving as the router may take the form of or include an Ethernet router. Ethernet and WiFi type wireless Ethernet are used here by way of example, only; and other types of communication media and corresponding access and routing devices may be used.

The LAN in our example is a building, campus area or enterprise wide private network. The LAN may use any networking technology and/or media suitable to the particular premises and the needs or operating desires of the entity or entities that will utilize the premises. The LAN or other such network also provides communications connectivity to a wider area network, such as an intranet between buildings or campuses and/or the public Internet, as generally represented by the wide area network (WAN) in the drawing.

While the previous discussion of FIG. 3 focused on physical network communication between the various system elements, it should be understood that the enhanced fixtures and luminaires, as well as possibly one or more other system elements (e.g., standalone sensors, UI devices, third party devices, etc.), also support visual light communication. As such, enhanced fixtures and luminaires within each room or area are capable of transmitting and receiving data via visual light communication as part of autonomous neighbor discovery and logical mapping and/or commissioning.

Separate from the physical networking configurations are various logical relationships among the system elements. For example, although generally similar in many respects, one of the devices in a room or other service area may be configured as a 'leader' unit whereas other system elements in the particular room or other service area may be configured as 'follower' units with respect to the designated leader. These relationships, however, are relatively dynamic and readily configurable. For example, programming of the devices/elements in the system provide automatic/autonomous discovery at installation; and at least part of the discovery may entail automatic neighbor discovery of lighting devices. An initial set-up routine uses results of the discovery process to set-up logical relationships between devices, for example, including selection of a device as a leader unit. However, at a later time, if the leader unit is impaired or off-line, the network is self-healing in that some or all of the set-up routine including neighbor discovery can be run again to select a replacement as a new leader unit from among the other devices that are operational on a particular part of the network. Alternatively, the system may have a "fallback" plan in place, in which one or more other elements are pre-designated to take over the role of the leader in the event of failure or impairment of the initially selected leader. Effectively, such an arrangement may identify a first in command (leader), a second in command, etc. Similar procedures can be used to discover newly installed equipment.

In an additional example of a logical relationship, operation of lighting within a room may be based on physical relationships between individual system elements. For example, the enhanced fixture and luminaires of corridor 9 may be configured in such a manner so as to illuminate only an occupied portion of the corridor and transition the illumination through the corridor as the occupant moves along the corridor. In such a configuration, visual light communication, for example, is utilized as part a neighbor discovery process and the resulting neighbor determinations, for example, provide a basis for configuring the appropriate system elements.

Each element communicating via the premises networks that form part of the lighting system have one or more addresses or identifiers, to facilitate communications via the particular media used for the networking and/or to identify each device to other devices on the system or outside the system with which each device may communicate. For example, if Ethernet is used, each device may have a media access control (MAC) address assigned to the Ethernet interface within the respective device. Each device may also have an Internet Protocol (IP) address assigned thereto. Depending on the interface of the LAN to the outside world, each device may have an internally assigned IP address, which a firewall or network address translation (NAT) device translates as appropriate when the device communicates via the WAN. If a device communicates with the WAN more directly, it may receive an IP address that is useable on the WAN, although if the address space is still that of IPv4, such an address would likely be assigned on a dynamic basis only for as long as the particular device in the premises may need the address. Each device will also typically have some form of electronic serial number for identification purposes, although there are a variety of different types of such identifiers that may be used for some or all of the devices that communicate via the illustrated system and its network media. Another approach might utilize cellular network type addressing and identification, in which case, each device might have an assigned cellular telephone number and an electronic device identifier such as an International Mobile Subscriber Identity (IMSI) or the like. In one example, one such identifier is transmitted via visual light communication as part of a neighbor discovery procedure.

The premises may include a LAN or other on-premises network, or the communications may go directly to the particular WAN. Alternatively, there may be a LAN or other network formed within the premises, but without a coupling or connection to a wider area network, for example, to restrict access and therefor increase security of the lighting network and the like within the premises. The LAN/WAN combination of FIG. 2 provides communications capabilities inside and outside the premises in a manner analogous to the network 51 in the example of FIG. 1. Depending on the network media and protocol(s) used, the LAN may include a frame switch, a packet router or the like providing LAN interconnectivity. Although not shown, a gateway or the like may also be deployed on the LAN to provide various functions in support of interconnectivity of the LAN to/from the WAN.

The LAN functionality, however, may essentially be embedded in the room or area elements, except for the interconnecting media. For example, any of the system elements in each room or other service area may provide connectivity and switching/routing functions to interconnect the system elements via the applicable media to form a LAN on the premises 12. Also, one of the elements in a room or area may provide the interface to any external WAN. Hence, although shown separately for convenience, the elements that form the LAN may be integral with the lighting devices, etc. of the lighting system in the rooms or other types of areas serviced by the illustrated system. Alternatively, all intelligent system elements may connect directly to the WAN. If the elements all connect through the WAN to a "cloud" service, the communication between elements could occur via exchange through the cloud server.

The WAN communication capability, particularly if the WAN is a relatively public network such as the Internet, may allow various parties to access the lighting network and the system elements that communicate via the network. For example, the enterprise or other entity that operates the premises may access the system remotely. Also, a provider of some or all of the lighting system equipment and network may access the element or elements of the system that they provide, e.g. for monitoring, maintenance or other system service including any updates to the configuration involving commissioning changes.

The LAN as discussed here need not be a LAN of the type typically used today for computer or mobile device communications within a particular premises, although the lighting system may use or connect to such a network. For purposes of the present discussion, the LAN is a premises network for data communications among the elements discussed herein as part of the lighting system and/or using the associated networking capability of that system for communications within the premises.

The hub gateways or other elements of the overall system that provide the router functionality may be linked together, for example, to form or help to form the LAN. The hub gateways or the like may be implemented utilizing available network components.

Although not shown, there may be an additional layer of networking and/or control, between the LAN and the WAN. For example, an enterprise having a wide geographical operation at multiple locations may have LANs at each building or campus and a enterprise-wide intranet interconnecting those locations. If desired (and security is not an issue), the enterprise-wide intranet would provide the access/connectivity to the Internet. For enterprise monitoring and control, the enterprise-wide intranet would facilitate communications for other servers and/or user terminal devices of enterprise personnel to communicate with the equipment at each location that is on the respective lighting network LAN.

The discussion to this point relative to FIG. 3 has focused mainly on various types of physical networking that can be used in and/or provided by a lighting system of the type under consideration here. In addition to physical networking, such a system associates various elements/components of the system in a number of 'logical' ways. Logical associations allow elements to be linked together, for example, based on a control grouping, based on similar properties, based on proximity, a variety of other criteria and/or combinations of any or all such properties. As one example, devices within one room or other type of service area that are to be operated in some unified manner (e.g. to light the room or area) may be linked together in one logical grouping. In this one example, identification of the devices within the room or other type of service area may be based on autonomous neighbor discovery via visual light communication. All of the wall controller type user interface devices in a building might be logically linked in one grouping to offer the ability to create an overall view of the lighting operations users have selected throughout the building. As another example, all sensors (or all sensors of one type) may be linked together in a logical grouping to allow reporting of one or more detect conditions on an overall basis across the premises or some portion (e.g. one floor) thereof.

Also, logical networks may be networked together for some purposes, so that a function of one logical network may influence an operation within another logical network. For example, if enough controllers indicate that lights have been turned to a particular level, other lights not to that level yet in other rooms areas may be similarly adjusted. One or more linked networks can affect each other and possibly still other logically networked elements. For example, if >x % of the occupancy sensors in an area or space (e.g. floor or building), then the space is considered "unoccupied." If >y % of the lights are OFF, then the enterprise office formed by the space is considered "closed." If the space is both "unoccupied" and "closed," then the system can turn down the HVAC for the space and turn ON the security system.

As outlined above, various elements of system 10 within a particular premises 12 (FIG. 2) can be provisioned in a variety of ways to suit different system objectives. Provisioning generally establishes capabilities of elements to communicate with each other via the particular media in service areas and throughout a particular premises, and through that networking, with an outside network (if desired). Configuration sets up various elements of the system 10 in logical groupings, where different groupings support different ones of the system functions. Logical associations or groupings into sub-networks may be based on various parameters. In one example, such configuration in logical groupings is based, at least in part, on logical mapping performed utilizing neighbor relationships determined by an autonomous neighbor discovery via visual light communication.

It may be helpful at this point to consider some examples of logical configurations. As discussed earlier, FIG. 3 shows examples of physical networking in a simple example of a building (or portion of a building) as a premises where a system like that of FIG. 2 may be installed. Communications via such networking is facilitated by the element provisioning, e.g. storage of provisioning data in the appropriate system elements. FIG. 4 shows the same building, with the same lighting system elements installed in the rooms 1-8 and corridor 9 of that building. However, where FIG. 3 depicted a physical network overlay on the floor plan, FIG. 4 shows logical networks or groupings of system elements as overlaid on that same floor plan. The logical relationships of FIG. 4 are facilitated by the element configuration, e.g. storage of configuration data in the appropriate system elements.

FIG. 4 illustrates several different types of logical associations into sub-networks, based on element locations and/or proximity. Some aspects of location may be known, e.g. based on element location data stored in the device and/or stored in a central overseer functionality. Proximity may be determined from known location of the different system elements. Alternatively, relative proximity of lighting devices may entail detection by light transmission and light sensing, for neighbor discovery, as described in greater detail below. For example, a sensor (S) for detecting light or an enhanced light fixture (EF) enhanced by inclusion of a light sensor therein may detect light from one or more other luminaires or enhanced fixtures within the respective service area or detectable via a doorway or the like. To identify different light emitters, each lighting device may modulate its output in an identifiable manner, e.g. with an identification code for a short periodically recurring interval or during a set-up (or re-set) operation. Counts of received transmissions are accumulated and processed to determine neighbor relationships, which in turn can be used in configuration set-up of various logical groupings.

As a first example, the various system elements within each of rooms 1 to 8 are grouped or associated to form a logical sub-network in the respective room, as represented generally by the "Room" network cloud shown in each of rooms 1-8. Similarly, the various system elements within the corridor 9 are grouped or associated to form a logical sub-network in corridor 9, as represented generally by the "Corridor" network cloud. The service area (room or corridor in this simple example) type sub-network configurations, for example, may facilitate unified lighting control, e.g. in response to inputs via a lighting controller (UI device in the examples) and/or one or more sensors in each respective room.

However, such sub-networks and the elements in such sub-networks can then be logically associated. In the example, the various system elements within each of rooms 1 to 4, that is to say, the elements of the room networks in those first four rooms, are grouped or associated to form a logical sub-network for the rooms on that side of the building, as represented generally by the "North-side Rooms" network cloud. Similarly, the various system elements within each of rooms 5 to 9, that is to say, the elements of the room networks in those other four rooms, are grouped or associated to form a logical sub-network for the rooms on that side of the building, as represented generally by the "South-side Rooms" network cloud. The building side sub-network associations may facilitate some operational function that is coordinated based on the side of the building. For example, if ON, lighting intensity in rooms on a side of the building may be adjusted in a coordinated manner based on time (day of the year and time of day), e.g. so that the lighting adjusts for expected differences in outside lighting entering rooms on a particular side of the building. As another example, if a cloud starts passing a shadow sequentially across multiple rooms, rooms later in the sequence of shadow passage might be able to predict and therefore prime the systems in those rooms to minimize the disruption.

Logical association can also be used to group system elements into one or more still larger area sub-networks. In the example, all of the system elements in the various rooms 1-8 as well as the system elements in the corridor 9 also are associated in a floor or building sub-network, as represented generally by the "Floor/Building" network cloud. This wider sub-network association may facilitate coordinated functions across a wider portion of the premises, i.e. across all of the rooms and the corridor in our simple example. For an enterprise that closes at a particular time, for example, all lighting except emergency, security and/or exit lights throughout the floor/building network may shut down at a set time shortly after the designated closing time, when all employees of the enterprise are expected to have departed the premises. As another example, in an emergency (detection of a fire or the like), the lighting in all of the rooms may come on at once whereas the lights in the corridor might flash in a coordinated sequence to lead people to the emergency exit from the space.

In these examples, the various logical associations are implemented based on configurations for particular operations, regardless of the physical networking used in the various service areas of the premises. Consider rooms 7 and 8 by way of an example. As shown in FIG. 3, communications for the system elements in room 8 are routed through the gateway hub (Gw) in room 7. However, as shown in FIG. 4, the system elements in room 7 are logically associated in one individual room-lighting sub-network, and the system elements in room 8 are logically associate in another individual room-lighting sub-network. In the configuration of FIG. 4, the logical groupings relative to rooms 7 and 8, for example, allow the UI device serving as a lighting controller in room 7 to control the operations of the luminaires (L) and the enhanced lighting fixture (EF) in room 7 and allow the UI device serving as a lighting controller in room 8 to control the operations of the luminaires (L) and the enhanced lighting fixture (EF) in room 8. The sensor (S) in room 7 may influence lighting functions of the luminaires (L) and the enhanced lighting fixture (EF) in room 7. If the enhancements of the enhanced lighting fixtures (EF) include sensors, the sensor in the enhanced lighting fixture (EF) in room 7 influences lighting functions of that fixture and/or of the luminaires (L) in room 7, whereas the sensor in the enhanced lighting fixture (EF) in room 8 influences lighting functions of that fixture and/or of the luminaires (L) in room 8.

Although the additional grouping is not shown, the elements in the two rooms 7 and 8 may be associated together in yet another logical sub-network. For example, if the two rooms are parts of a conference room separated by a moveable partition, the two groups might work together (via a third grouping that encompasses elements in both rooms), e.g. when the partition is open to join the two rooms into one large conference space. The opening of the partition may be recognized by sensing of position or configuration of the partition or by sensing of appropriately modulated light emitted from a lighting device L or EF in one room by a sensor S (or a sensor in an enhanced fixture EF) in the other room. The opening of the partition may be detected by establishment of any other type of detectable connection through an appropriate communication media (e.g. any type of signal that is substantially attenuated or blocked by the presence of the partition, and strong when the partition is removed). When open, either one or both of the UI devices functioning as a lighting controller but located in room 7 or room 8 may control all of the luminaires (L) and enhanced lighting fixtures (EF) in both rooms 7, 8 in a unified manner. When the partition is later closed, operations of the system elements in the two rooms 7 and 8 would revert to independent lighting operation based on the two logical groupings for those rooms as illustrated by the sub-network clouds in rooms 7 and 8 in FIG. 4.

One layer of provisioning and logical configuration implemented by the commissioning process example includes logical association of system elements based on location or proximity, for example, within a lighting service area such as a room or corridor. It may be helpful to consider an example of such a commissioned set of system elements, particularly the resultant operation thereof, in a bit more detail. A room 4 (FIGS. 3 and 4) having elements configured in a 'Room' network (FIG. 4), for example, has three luminaires (L), and enhanced light fixture (EF), a user interface (UI) device at least set-up as a lighting controller and a sensor (S). For purpose of discussion of this example, we will assume that the sensor (S) is an ambient light sensor, and that the enhancement of the fixture (EF) involves at least the inclusion of an occupancy sensor.

As a result of a network discovery step in the commissioning process, all of the system elements L, EF, UI and S in the room 4 are provisioned to communicate with each other to the extent as may be appropriate for Room network operations. The system elements also are logically configured by the other steps of the commissioning process, as appropriate to implement respective functions for lighting service in the room 4. For example, the lighting controller/UI device will have stored the identifications and information as to respective capabilities of at least the lighting devices L and EF in the room that the device UI will control for the lighting service. The enhanced fixture (EF) will have stored the identifications and information as to respective capabilities of the user interface (UI) device and the ambient light sensor (S). Each luminaire (L) will have similarly stored the identifications and information as to respective capabilities of the user interface (UI) device and the ambient light sensor (S). In addition, each luminaire (L) will have similarly stored the identification and information as to the capabilities of the enhanced fixture (EF), so that each luminaire can receive and respond to occupancy sensing information from the enhanced fixture (EF). Conversely, the enhanced fixture (EF) will have stored the identifications and information as to respective capabilities of the luminaire (L), at least to the extent necessary to enable the enhanced fixture (EF) to notify the luminaire (L) of occupancy states of the room 4.

As a result, if a person enters room 4 and activates the UI device when the room lighting is OFF, the UI device will respond by sending turn ON commands through the network media to the lighting devices L and EF in the room. The lighting devices L and EF in the room will receive the command and turn their respective light sources ON. The occupancy sensor function of the fixture EF will also indicate an occupied room state and the fixture EF will notify the luminaires (L) of that state by transmitting appropriate messages through the room network media to the luminaires (L). The sensor (S) will also detect ambient light intensity and notify the lighting devices L and EF in the room through the network media, and the lighting devices L and EF will adjust the output intensities of the light sources accordingly. If the person later leaves the room 4 without turning the lights off via operation of the user interfaced (UI) device, this change can be detected by the occupancy sensor function of the fixture EF, and the fixture EF will send notifications thereof through the room network media to the luminaires (L). If the unoccupied state persists for some period of time, e.g. 10 minutes, the lighting devices L and EF in the room will turn their light sources OFF.

The On/Off lighting example described above with respect to room 4 and the system elements in that room is given by way of a simple illustrative example of operations of a portion of the system 10 that may be implemented using the provisioning and configurations of the type automatically established via a commissioning process, more detailed examples of which will be discussed later. The system 10 and the commissioning thereof, however, may support a wide range of other types of operations for lighting control and other services that may be implemented or at least controlled in whole or in part via the system 10 and its communications capabilities.

The sub-network associations in the examples of FIG. 4 were based mainly on location and/or proximity relationships. For example, elements in a particular room or corridor were grouped together, elements in rooms on a particular side of the floor or building were grouped together, and system elements located within the particular floor or building were grouped together.

The discussion of FIG. 2 provided a general overview of an example of a system, and the FIGS. 3-4 outlined examples of various physical and logical relationships that may be used in or implemented with such a system. As indicated at several earlier points in the discussion, much of the set-up of the physical and/or logical relationships can be established as part of a commissioning procedure, such as the process described relative to FIGS. 1 and 1A. Hence, it may be helpful to consider the relatively simple example of the commissioning procedure performed via visual light communications in relation to FIGS. 1 and 1A in greater detail relative to FIGS. 6-8. However, since performance of visual light communications may be based on the ability of a lighting device to generate visual light with an appropriate level of power, it may be helpful to first consider a calibration process, such as the calibration process depicted in FIG. 5.

Different rooms or areas, such as room A and area B of premises 12, exhibit different physical characteristics, particularly as it relates to light transmissions. In particular, different surfaces may reflect light differently. For example, a room with a carpeted floor and painted walls, such as may be found in an office, will reflect light differently than a room with a tiled floor and walls covered with shelves or other displays, such as might be found in a retail location. While an optical receiver of a neighbor lighting device may receive some portion of visual light communication via direct visual light generated by the transmitting lighting device, more likely the received visual light communication will occur via reflected visual light. As such, it is often helpful to calibrate each transmitting lighting device to generate and/or modulate visual light at a power level appropriate to the characteristics of the room or area in which the lighting device is installed.

Figure 5:
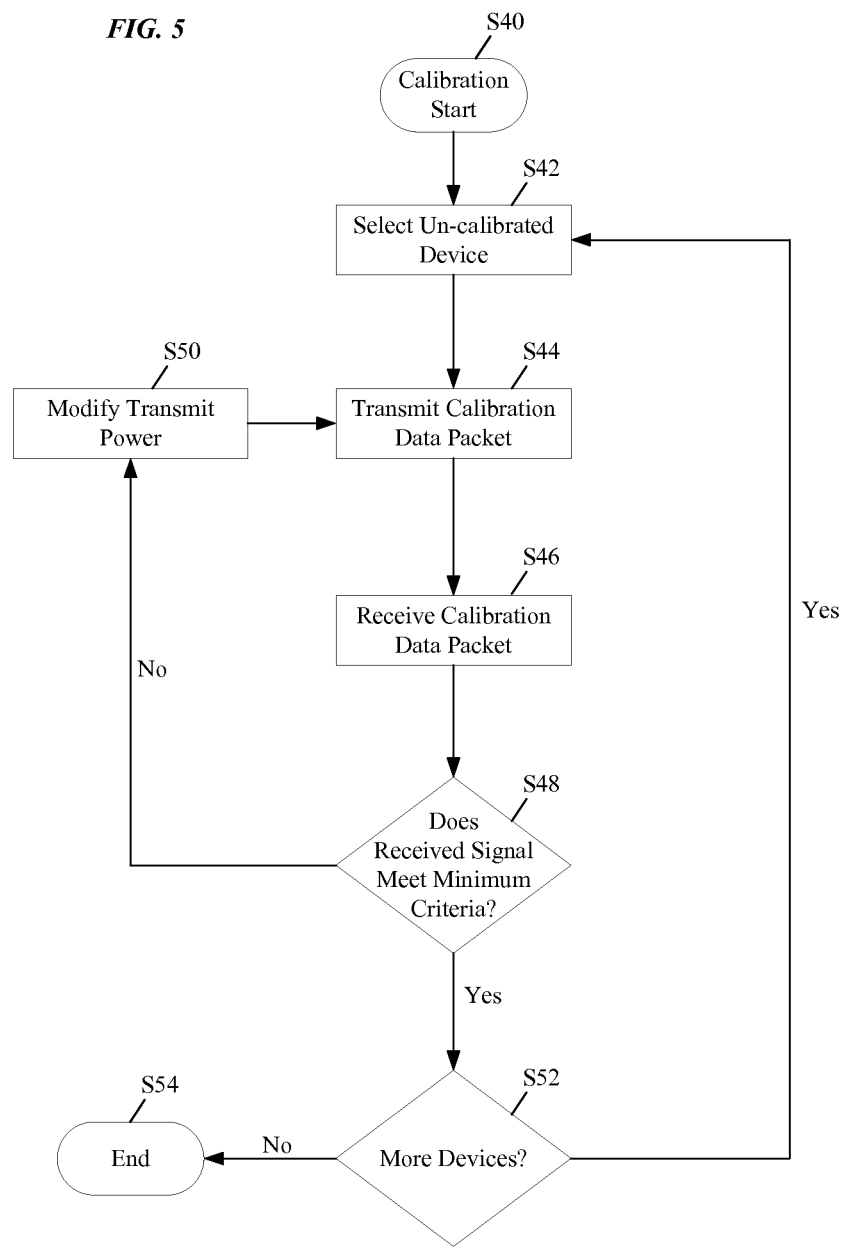
FIG. 5 is a flow chart of an example of a procedure for calibrating visual light communication by a lighting device in a system like that shown in FIG. 2.

FIG. 5 illustrates an example of a process flow for calibrating lighting devices for use with visual light communication, such as might be utilized in the commissioning of system 10. In step S40, the calibration process starts. An un-calibrated lighting device is selected in step S42. The selected lighting device, in step S44, transmits a calibration data packet. The calibration data packet includes, for example, an identifier of the selected lighting device. In one example, the selected lighting device, such as lighting device 11 of FIG. 1A, operates light source 19 to generate visual light modulated in such a manner so as to transmit the calibration data packet. In step S46, the transmitted calibration data packet is received by the selected lighting device. For example, optical receiver 15 of lighting device 11 receives the transmitted visual light communication; and lighting device 11, via conditioning circuit 137 and MCU 125, detects the calibration data packet from the received visual light.

At step S48, the lighting device determines whether the received signal meets minimum criteria. That is, the lighting device determines if the visual light is transmitted with sufficient power such that the received visual light retains sufficient form to allow demodulation of the visual light communication. If not, transmit power is modified at step S50 and steps S44, S46 and S48 are repeated. Otherwise, the process continues to step S52 where it is determined if more devices are to be calibrated. If more devices are to be calibrated, the process returns to step S42 and the next un-calibrated lighting device is selected. If there are no more devices to be calibrated, the process ends in step S54.

Figure 6:
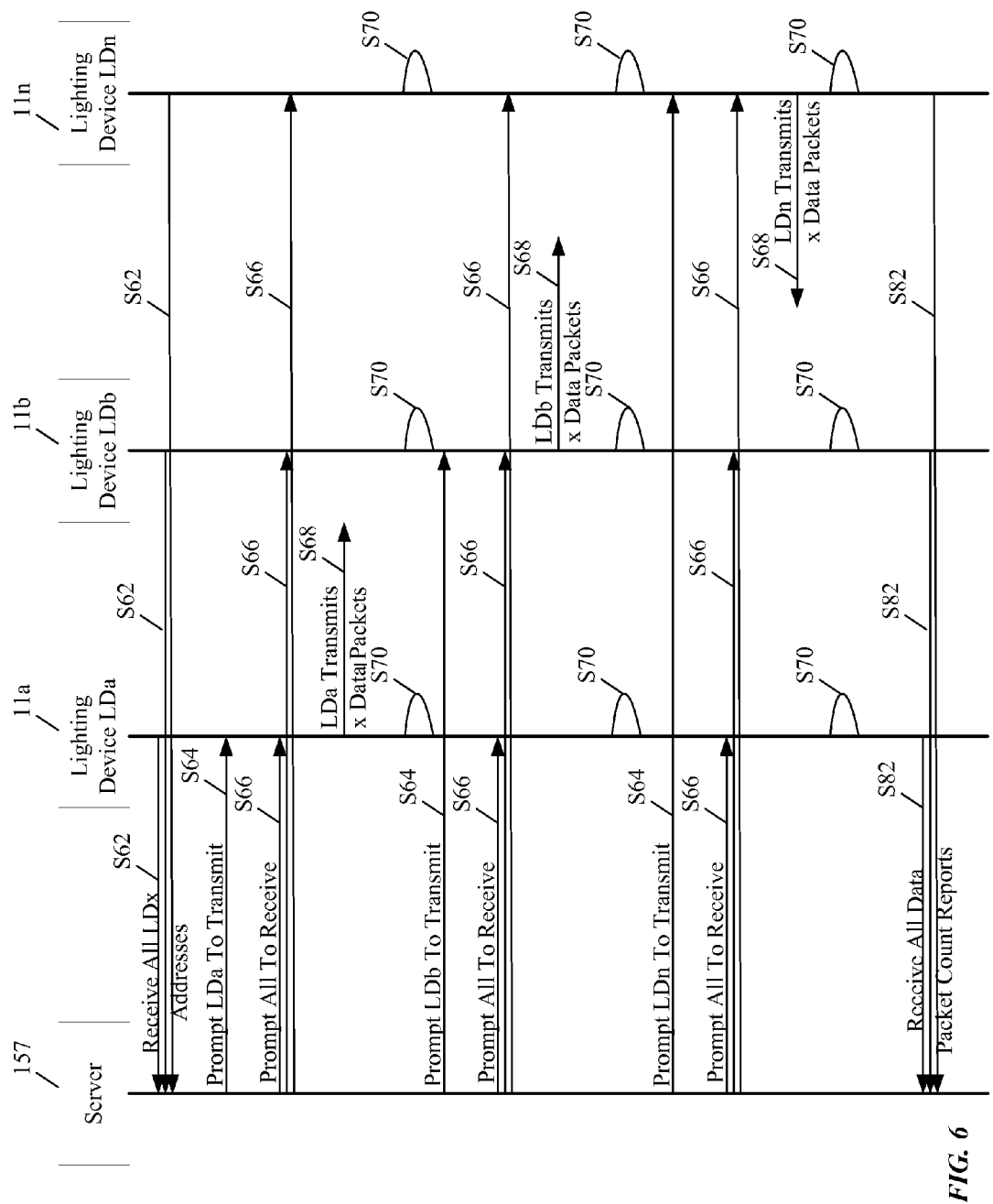
FIG. 6 is a signal flow diagram depicting an example of signal flows during a portion of the process flow example of FIG. 1 related to autonomous neighbor discovery.
Figure 7:
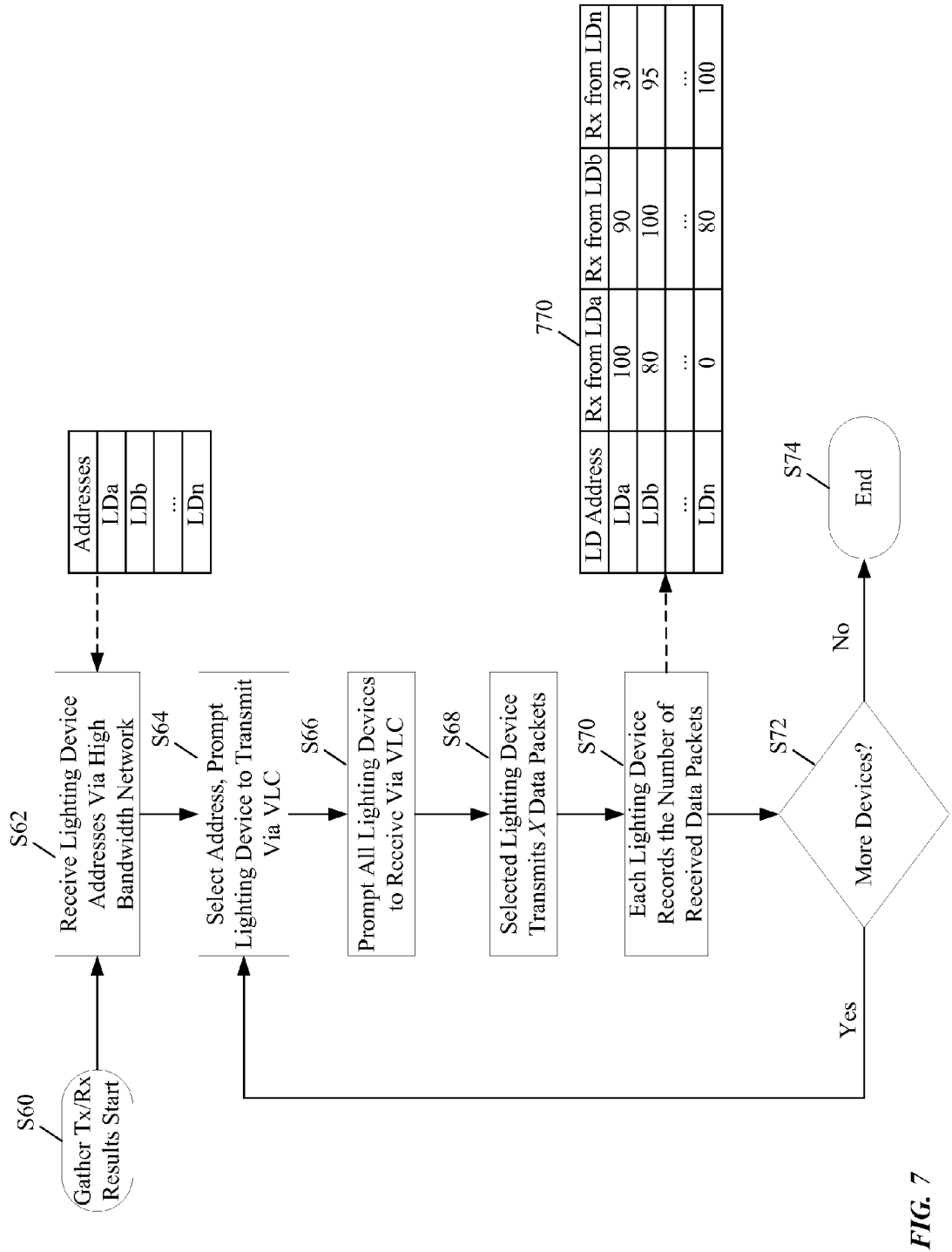
FIG. 7 is a flow chart of an example of a process flow corresponding to the signal flows example of FIG. 6.
Figure 8:
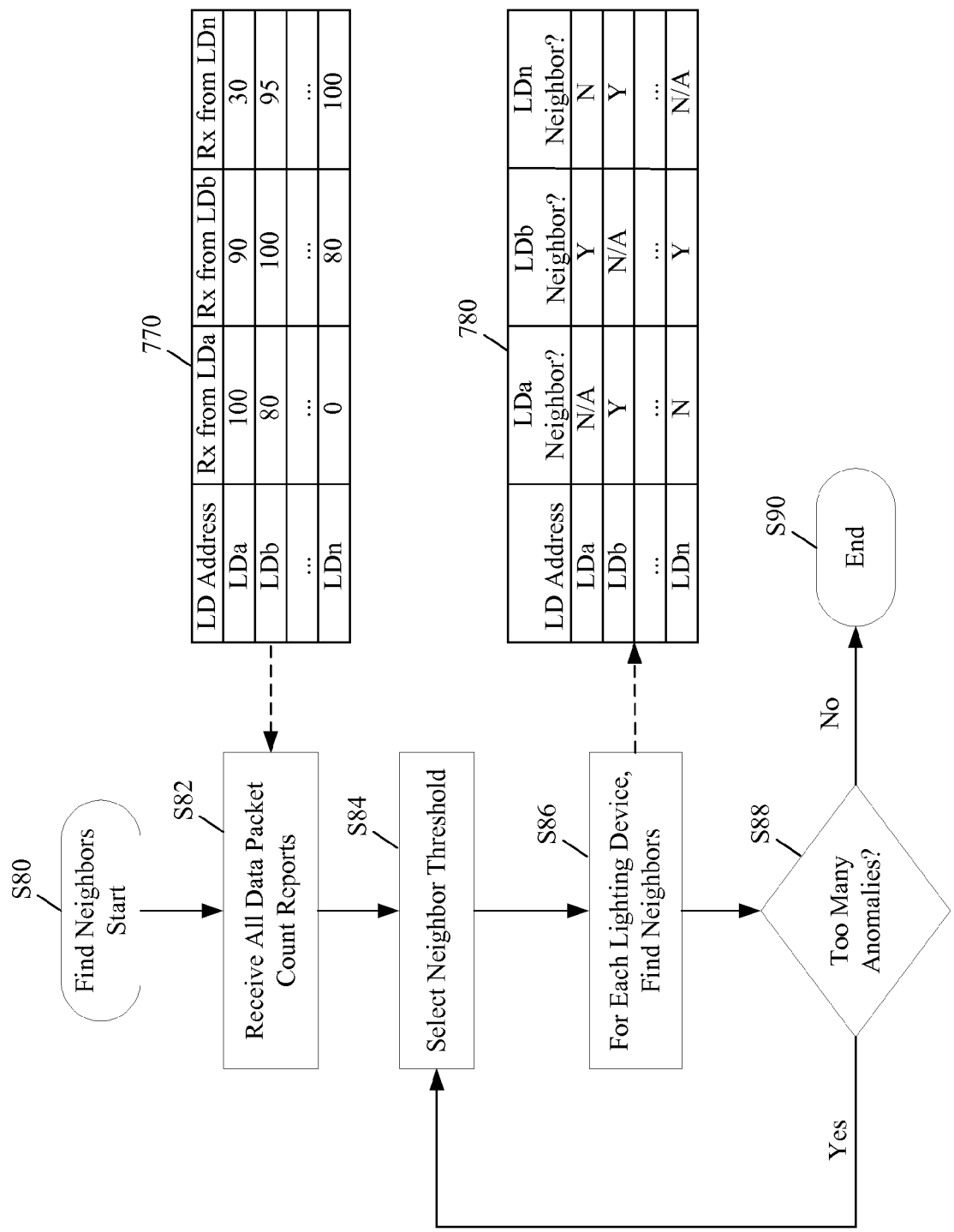
FIG. 8 is a flow chart of a slightly more detailed example of a portion of the process flow of FIG. 1 related to neighbor relationship determination.

Once any needed calibration is complete, commissioning of lighting devices can be performed, such as depicted by way of example in FIGS. 6-8. FIG. 6 illustrates an example of a signal flow chart depicting signal flows within a self-commissioning process, such as the commissioning process under consideration herein. While FIGS. 1 and 1A depict a relationship between a server 157 and a lighting installation 151 as a whole, FIG. 6 depicts a relationship between the server 157 and specific lighting devices 11a, 11b, 11n having respective addresses LDa, LDb and LDn, which may be part of installation 151. Furthermore, the steps depicted in FIG. 6 are similar to steps S102-S116 of FIG. 1.

In step S62, server 157 receives respective addresses LDa, LDb and LDn from each of the lighting devices. As with step S102 of FIG. 1, address delivery is, for example, via a high data rate or high bandwidth capacity network, such as networks 17A, 17B of FIG. 2. In a first step S64, server 157 prompts lighting device with address LDa to transmit a data packet; and, in a first step S66, server 157 prompts each lighting device to receive a data packet. In one example, each prompt is a command or instruction sent via the high data rate or high bandwidth capacity network. In a further example, the prompt to receive includes an identification of the transmitting lighting device (e.g., an address or other identifier of LDa). The prompt to receive also includes, for example, the number of packets to be transmitted (e.g., x). The prompt to transmit includes, for example, content to be transmitted as part of the data packet. The prompt to transmit also includes, for example, the number of packets to transmit (e.g., x).

In a first step S68, lighting device LDa transmits a respective data packet via visual light communication. As discussed above, the respective data packet is repeatedly transmitted x number of times. In one example, each data packet includes an identifier of the lighting device transmitting the data packet. Such identifier may be the address of the lighting device or some other identifier, such as a serial number. In a further example, such identifier is an 8-bit value e.g. as may be assigned by the server. As mentioned above, the identifier to be transmitted is provided, for example, by server 157 as part of the prompt to transmit. Alternatively, or in addition, the lighting device may retrieve the identifier from memory as part of a pre-existing configuration of the lighting device or select the identifier from an otherwise pre-existing value (e.g., serial number).

In a first step S70, each of lighting devices LDa, LDb and LDn attempts to receive the x number of transmitted data packets and records a received data packet count for LDa. In one example, the amount of time needed to transmit x number of data packets is known or otherwise determinable by each of the lighting devices. In this one example, each lighting device determines an amount of time during which the lighting device will attempt to receive data packets. Alternatively, the amount of time may be delivered to each lighting device as part of the prompt to receive. During the appropriate amount of time for receiving data packets, each lighting device, for example, "listens" for transmitted data packets via visual light communication and counts the number of received data packets. In another example, the prompt to receive is a signal for each lighting device to begin "listening" and each lighting device continues "listening" until a subsequent signal to "stop listening" is received from server 157. In this other example, lighting devices count the number of data packets received after the prompt to receive and before the signal to "stop listening".

At this point, the process then repeats. Specifically, in a second step S64, server 157 prompts lighting device with address LDb to transmit a data packet; and, in a second step S66, server 157 prompts each lighting device to receive a data packet. As with the first step S64 and first step S66, each prompt is sent, for example, via networks 17A, 17B. In a second step S68, lighting device LDb repeatedly transmits a respective data packet x number of times via visual light communication. In a second step S70, each of lighting devices LDa, LDb and LDn attempts to receive the x number of transmitted data packets and records a received data packet count for LDb.

Because there are three lighting devices and the process is to be performed for each of the lighting devices acting as a transmitting device, the process is then repeated a third time. In a third step S64, server 157 prompts lighting device with address LDn to transmit a data packet; and, in a third step S66, server 157 prompts each lighting device to receive a data packet. In a third step S68, lighting device LDn repeatedly transmits a respective data packet x number of times. In a third step S70, each of lighting devices LDa, LDb and LDn attempts to receive the x number of transmitted data packets and records a received data packet count for LDn.

In FIG. 1, step S116 was performed to receive data packet count reports from each lighting device after each selected lighting device transmitted an identification signal. That is, in a lighting installation example including three lighting devices, step S116 would be performed three times. In contrast, step S82 of FIG. 6 is performed once after all lighting devices have transmitted respective data packets. As part of step S82, lighting device LDa has three received data packet counts (e.g., one for LDa, one for LDb and one for LDn) and delivers these three counts together as a data packet count report to server 157. Similarly, lighting devices LDb and LDn each also have three received data packet counts and each of LDb and LDn delivers a data packet count report to server 157. In one example, each data packet count report is received, for example, via the high data rate or high bandwidth capacity network. Server 157 receives, in step S82, all of the data packet count reports.

FIG. 7 illustrates an example of a flow chart depicting the same portion of a commissioning process as illustrated by the example signal flow of FIG. 6. In other words, FIG. 6 depicts signals exchanged between specific elements of a lighting installation as a result of the steps performed by various elements within the installation while FIG. 7 depicts those steps and the flow between those steps.

In step S60, the process to gather transmission (Tx) and reception (Rx) results starts. In step S62, lighting device addresses are received via a high data rate or high bandwidth capacity network, such as networks 17A, 17B of FIG. 2. In step S64, one lighting device is selected and prompted to transmit a data packet via visual light communication (VLC). In step S66, all lighting devices are prompted to receive via VLC. In one example, each prompt is a command or instruction sent via the high data rate or high bandwidth capacity network. In a further example, the prompt to receive includes an identification of the transmitting lighting device (e.g., an address or other identifier of LDa). The prompt to receive also includes, for example, the number of packets to be transmitted (e.g., x). The prompt to transmit includes, for example, content to be transmitted as part of the data packet. The prompt to transmit also includes, for example, the number of packets to transmit (e.g., x).

In step S68, the selected lighting device transmits x number of data packets via VLC. Similar to step S68 of FIG. 6, each data packet includes, for example, an identifier of the lighting device transmitting the data packet. Such identifier may be the address of the lighting device or some other identifier, such as a serial number. In a further example, such identifier is an 8-bit value e.g. as may be assigned by the server. As in the process of FIG. 6, the identifier to be transmitted is provided, for example, by server 157 as part of the prompt to transmit. Alternatively, or in addition, the lighting device may retrieve the identifier from memory as part of a pre-existing configuration of the lighting device or select the identifier from an otherwise pre-existing value (e.g., serial number).

In step S70, each lighting device records the number of received data packets as a received data packet count. In one example, the amount of time needed to transmit x number of data packets is known or otherwise determinable by each of the lighting devices. In this one example, each lighting device determines an amount of time during which the lighting device will attempt to receive data packets. Alternatively, the amount of time may be delivered to each lighting device as part of the prompt to receive. During the appropriate amount of time for receiving data packets, each lighting device, for example, "listens" for transmitted data packets via visual light communication and counts the number of received data packets. In another example, the prompt to receive is a signal for each lighting device to begin "listening" and each lighting device continues "listening" until a subsequent signal to "stop listening" is received from server 157. In this other example, lighting devices count the number of data packets received after the prompt to receive and before the signal to "stop listening".

As described above, some number of received data packet counts are compiled into data packet count reports and collected by server 157, such as in a count reports table 770 depicted in FIG. 7. Although count reports table 770 is depicted as a table, this is only for simplicity and no such requirement exists. In the example count reports table 770, each row represents a data packet count report received from one lighting device. For example, the first row of count reports table 770 represents the data packet count report received from lighting device LDa while the second row represents the data packet count report received from lighting device LDb and the $n^{th}$ row represents the data packet count report received from lighting device LDn. As can be seen in the example, when lighting device LDa is the selected lighting device and transmits 100 data packets, lighting device LDa received 100 of those data packets, lighting device LDb received 90 of those data packets, and LDn received 30 of those data packets.

In step S72, it is determined whether more devices need to transmit. If yes, the process returns to step S64. As a result of subsequent iterations of the process, count reports table 770 includes additional information related to other lighting devices. Specifically, when lighting device LDb is the selected lighting device and transmits 100 data packets, lighting device LDa received 80 data packets, LDb received 100 data packets and LDn received 95. Likewise, when lighting device LDn is the selected lighting device and transmits 100 data packets, lighting device LDa received 0 data packets, LDb received 80 data packets and LDn received 100 data packets. If step S72 determines there are no more devices to transmit, the process ends in step S74.

While the commissioning process of FIGS. 6-7 is depicted as a series of iterative steps involving a server prompting various lighting devices to perform specific functions at particular times, this is only for simplicity. In an alternative example, the amount of time necessary for one lighting device to transmit x number of data packets is known and defines a period of time for which remaining lighting devices will receive or otherwise attempt to receive the data packets from the transmitting lighting device. In this alternate example, an order in which individual lighting devices will transmit is determined and this pre-determined order is communicated to each of the lighting devices. Then, following the pre-determined order, each lighting device transmits an identification signal and the remaining lighting devices receive or otherwise attempt to receive during the predefined time period. Further in this alternative example, since the pre-determined order to transmit is known by all lighting devices, individual lighting devices may not need to be capable of "interpreting" the transmitted identification signal in order to record the received data packet count for the transmitting lighting device. Instead, since the receiving lighting device knows that a particular lighting device, such as LDa from FIGS. 6-7, is to be transmitting during a particular time period, the receiving lighting device need only count the number of data packets received during the particular time period and record that count.

In yet another example, individual lighting devices may be selected randomly and/or each individual lighting device may initiate transmission on a random or otherwise uncoordinated basis. Further in this example, since each lighting device may receive data packets from more than one transmitting lighting device during a given time period, each lighting device may need to be capable of "interpreting" the transmitted identification signal. That is to say, instead of simply counting the number of data packets received during a time period, a receiving lighting device would evaluate each received data packet to determine the source of the received data packet and record an updated count in the respective received data packet count.

In the examples of FIGS. 6-7, received data packet counts are delivered to server 157. As described throughout, server 157 may be a physical server and/or other centralized or distributed processing or management function, such as software or firmware executing on a processor. Alternatively, such management function may be performed by one or more of the lighting devices within lighting installation 151. Furthermore, as described in relation to FIG. 1A, each lighting device may be able to process data packet counts received from some number of other lighting devices in order to generate a neighbor table for the respective lighting device.

While FIGS. 6-7 provide a more detailed example of steps S102-S118 of FIG. 5, FIG. 8 provides a more detailed example of step S120 of FIG. 5. Specifically, FIG. 8 illustrates an example of a process flow for determining neighbor relationships based on data packet count reports received by server 157 from various lighting devices. The process starts in step S80.

In step S82, a server, such as server 157, receives all data packet count reports from lighting devices within lighting installation 151. Step S82 of FIG. 8 is identical to step S82 of FIG. 6 and similar to step S116 of FIG. 5. In other words, a compilation of data packet count reports, such as count reports table 770, is referenced throughout the process of FIG. 8. In step S84, a neighbor threshold is selected. The neighbor threshold is, for example, an arbitrary determinate for calculating whether a receiving lighting device is a neighbor of a transmitting lighting device. In one example, the neighbor threshold is represented as a percentage. Thus, in one example the neighbor threshold is selected to be 60% in step S84.

In step S86, a formula is applied to received data packet counts for a transmitting lighting device from each of the receiving lighting devices to determine whether each receiving lighting device is a neighbor of the transmitting lighting device. In one example, the formula is expressed as $PR_jMrx_i > bLD_i * n\%$. In this example, i and j are integers that range from 1 to a maximum number. The maximum number may be the total number of lighting devices within the lighting installation or some fewer number of lighting devices for which neighbor relationships are to be determined. Furthermore, $LD_i$ is the $i^{th}$ transmitting lighting device and $PR_j$ is the $j^{th}$ receiving lighting device. In our previous simplistic three lighting device example then, i would range from 1 to 3 and j would range from 1 to 3 with each of $LD_i$ and $PR_j$ being one of LDa, LDb and LDn. In addition, n is the selected neighbor threshold and $bLD_i$ is the baseline for the $i^{th}$ transmitting lighting device.

The baseline is, for example, a value calculated for each lighting device in order to minimize the impact of varying characteristics within a room or area, such as floor reflectivity. In one example, the baseline is expressed as $bLD_i = LD_iMrx_i/LD_iMtx_i$ based on packets received by the transmitting device itself. In this example, i is the same integer as with the above neighbor determination formula and $LD_i$ is the $i^{th}$ transmitting lighting device. Furthermore, Mtx is a transmitted data packet count and Mrx is a received data packet count. Thus, $LD_iMrx_i$ is the received data packet count representing how many data packets identifying the $i^{th}$ transmitting lighting device are received by the $i^{th}$ transmitting lighting device (i.e., how many data packets the transmitting device received from itself); $LD_iMtx_i$ is the transmitted data packet count for the $i^{th}$ transmitting lighting device (i.e., how many data packets the transmitting device transmitted); and $PR_jMrx_i$ is the received data packet count representing how many data packets identifying the $i^{th}$ transmitting lighting device are received by the $j^{th}$ receiving lighting device (i.e., how many data packets the receiving device received from another transmitting device).

Given the simplistic three lighting device lighting installation referenced in relation to FIGS. 6-7 and utilizing the above formula and baseline calculation, a neighbor relationship table, such as neighbor relationship table 780 depicted in FIG. 8, is generated. In one example, the neighbor threshold is selected to be 60% in step S84 and, in step S86, a baseline is calculated for each of the three lighting devices LDa, LDb and LDn. Further as part of step S86, a neighbor relationship status is determined for any given pair of lighting devices using the above formula.

For example, the baseline for each of lighting devices LDa, LDb and LDn is 1 (100 packets received/100 packets transmitted=1). Then, starting with LDa as the transmitting lighting device, it is determined in this example whether each of the receiving lighting devices are neighbors of lighting device LDa. Since LDa is the referenced transmitting lighting device, LDa as a receiving lighting device is noted as N/A. Whether LDb is a neighbor of LDa is determined based on $PR_jMrx_i > bLD_i * n\ \%$ is true. From the count reports table 770, $PR_jMrx_i$ is 80 (the number of data packets received from LDa by LDb). Furthermore, $bLD_i$ is 1 and n % is 60%. Therefore, LDb is determined to be a neighbor of LDa because 80>60 is true. However, LDn is determined to not be a neighbor of LDa because 0 (the number of data packets received from LDa by LDn)>60 is not true.

Similarly, LDa is determined to be a neighbor of LDb because 90 (the number of data packets received from LDb by LDa)>60 is true and LDn is determined to be a neighbor of LDb because 80 (the number of data packets received from LDb by LDn)>60 is true. Likewise, LDa is determined to not be a neighbor of LDn because 30 (the number of data packets received from LDn by LDa)>60 is not true and LDb is determined to be a neighbor of LDn because 95 (the number of data packets received from LDn by LDb)>60 is true.

Of note, the neighbor relationship table generated as part of step S86 includes not only whether a first lighting device is determined to be a neighbor of a second lighting device based on packets the first device received from the second device, but also includes whether the second lighting device is also determined to be a neighbor of the first lighting device based on packets the second device received from the first device. That is to say, neighbor relationships determined in the context of the process of FIG. 8, are uni-directional. Such uni-directional neighbor relationships, however, can be compared as an additional check or validation mechanism within the process of FIG. 8. In some examples, a first lighting device receives a sufficient number of data packets from a second lighting device in order to be classified as a neighbor of the second lighting device. However, in these examples, the second lighting device does not receive a sufficient number of data packets from the first lighting device in order to be classified as a neighbor of the first lighting device. In one such example, given count reports table 770 of FIG. 8 and a low neighbor threshold of 25 (instead of the earlier example threshold of 60), LDa would be determined as a neighbor of LDn (30>25 is true) while LDn would not be determined as a neighbor of LDa (0>25 is not true). In a similar example, given count reports table 770 of FIG. 8 and a high neighbor threshold of 90, LDb would be determined as a neighbor of LDn (95>90 is true) while LDn would not be determined as a neighbor of LDb (80>90 is not true).

Thus, while such mismatches in neighbor statuses based on the numbers of received data packets are potentially a result of varying conditions within the room or area of the lighting installation, such varying conditions can be minimized by selecting a different neighbor threshold (e.g., raising or lowering the neighbor threshold). As such, in step S88, it is determined if too many anomalies, or neighbor status mismatches, exist within the generated neighbor relationship table. If yes, the process returns to step S84 where a new neighbor threshold is selected. If no, the process terminates in step S90 with the most recently generated neighbor relationship report providing an indication of uni-directional neighbor relationships amongst the various lighting devices of the lighting installation.

Returning briefly to FIG. 1, neighbor relationships, such as those depicted in neighbor relationship table 780 of FIG. 8 based on the process of FIG. 8, are the result of step S120 and are utilized by traffic algorithms in step S122 to produce a logical and/or physical map of the lighting installation. In our simplistic three lighting device example, lighting devices LDa, LDb and LDn may be lighting fixtures within a corridor, such as the corridor depicted in FIGS. 3-4. In this situation, traffic algorithms run in step S122 might produce a logical map placing LDa next to LDb and LDb next to LDn (e.g., LDa, LDb and LDn in subsequent progression down the corridor). As a result, lighting devices LDa, LDb and LDn may be configured appropriately in step S124 without requiring an individual to walk the corridor and manually identify each of the devices and their relationships.

In this way, visual light communication is utilized as part of auto-discovery of neighbor relationships and self-mapping and/or commissioning of a lighting installation. Such auto-discovery and self-mapping minimizes or eliminates costly and time-consuming manual intervention and improves operations of the lighting installation.

Figure 11:
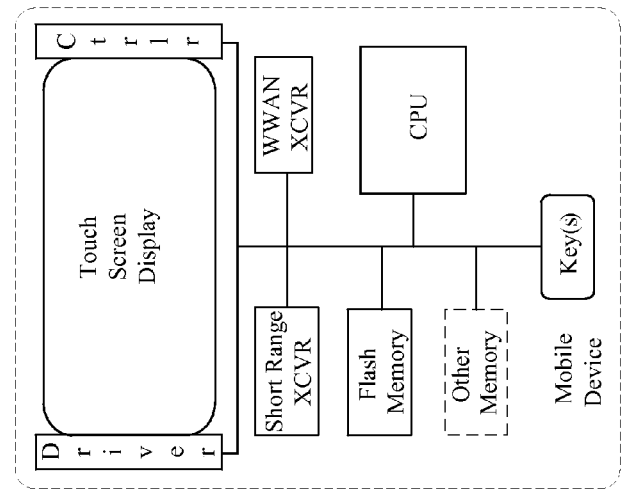
FIG. 11 is a simplified functional block diagram of a mobile device, as an alternate example of a user terminal device, for possible communication in or with the system of FIG. 2.
Figure 10:
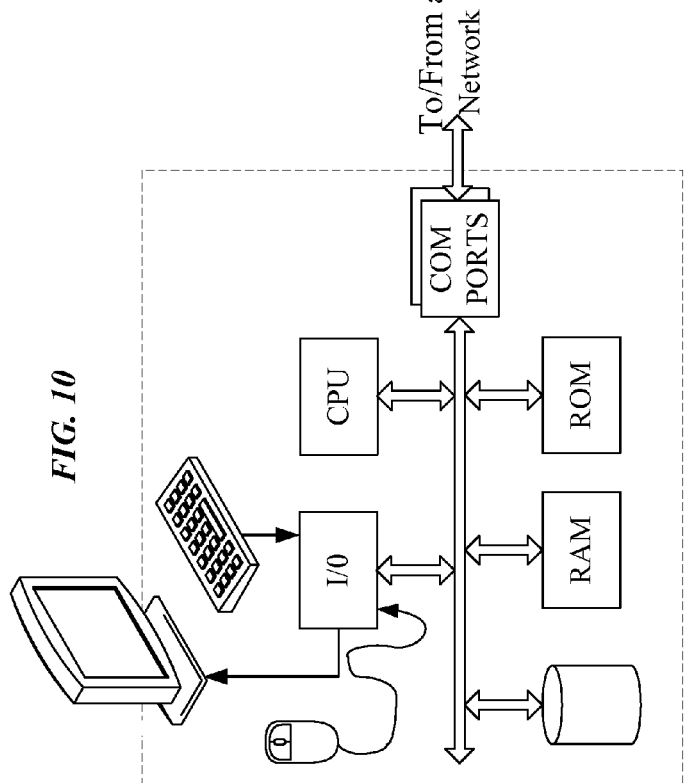
FIG. 10 is a simplified functional block diagram of a personal computer or other user terminal device, which may be used as the remote access terminal, in the system of FIG. 2.
Figure 9:
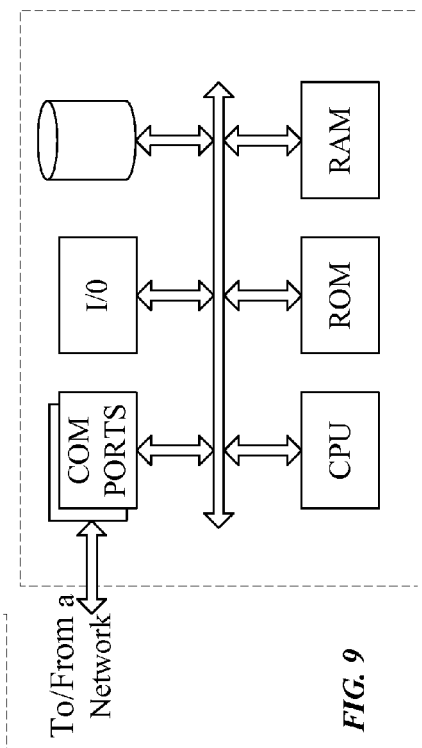
FIG. 9 is a is a simplified functional block diagram of a computer that may be configured as a host or server, for example, to function as the external server or a server if provided at the premises in the system of FIG. 2.

As shown by the above discussion, at least some functions of devices associated or in communication with the networked lighting system 10 of FIG. 1, such as elements shown at 53, 55 and 57, may be implemented with general purpose computers or other general purpose user terminal devices, although special purpose devices may be used. FIGS. 9-11 provide functional block diagram illustrations of examples of general purpose hardware platforms.

FIG. 9 illustrates a network or host computer platform, as may typically be used to implement a host or server, such the computer 53 or if provided as a separate platform the CO computer 57. FIG. 10 depicts a computer with user interface elements, as may be used to implement a personal computer or other type of work station or terminal device, such as one of the terminal 55 in FIG. 1, although the computer of FIG. 10 may also act as a server if appropriately programmed. The block diagram of a hardware platform of FIG. 11 represents an example of a mobile device, such as a tablet computer, smartphone or the like with a network interface to a wireless link, which may alternatively serve as a user terminal device like 55. It is believed that those skilled in the art are familiar with the structure, programming and general operation of such computer equipment and as a result the drawings should be self-explanatory.

A server (see e.g. FIG. 9), for example, includes a data communication interface for packet data communication via the particular type of available network. The server also includes a central processing unit (CPU), in the form of one or more processor circuits, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature, and it is presumed that those skilled in the art are adequately familiar therewith.

Of course, the server functions may be implemented in a distributed fashion on a number of similar platforms, to distribute the processing load.

Also, a computer configured as a server with respect to one layer or function may be configured as a client of a server in a different layer and/or for a different function. For example, the intelligent lighting devices 11A, 11B may operate as client devices of server functions implemented by CO 57, whereas the same platform performing the CO function may function as a client or as a server with respect to the computer 53. Also, user terminal devices such as 55 often are configured as client devices; and the CO 57 may function as a server with respect to client functionalities of devices such as 55.

A computer type user terminal device, such as a desktop or laptop type personal computer (PC), similarly includes a data communication interface, processing circuitry forming the CPU, main memory (such as a random access memory (RAM)) and one or more disc drives or other mass storage devices for storing user data and the various executable programs (see FIG. 10). A mobile device (see FIG. 11) type user terminal may include similar elements, but will typically use smaller components that also require less power, to facilitate implementation in a portable form factor. The example of FIG. 11 includes a wireless wide area network (WWAN) transceiver (XCVR) such as a 3G or 4G cellular network transceiver as well as a shorter range wireless transceiver such as a Bluetooth and/or WiFi transceiver for wireless local area network (WLAN) communication. The computer hardware platform of FIG. 9 and the terminal computer platform of FIG. 10 are shown by way of example as using a RAM type main memory and a hard disk drive for mass storage of data and programming, whereas the mobile device of FIG. 11 includes a flash memory and may include other miniature memory devices. It may be noted, however, that more modern computer architectures, particularly for portable usage, are equipped with semiconductor memory only.

The various types of user terminal devices will also include various user input and output elements. A computer, for example, may include a keyboard and a cursor control/selection device such as a mouse, trackball, joystick or touchpad; and a display for visual outputs (see FIG. 10). The mobile device example in FIG. 11 touchscreen type display, where the display is controlled by a display driver, and user touching of the screen is detected by a touch sense controller (Ctrlr). The hardware elements, operating systems and programming languages of such computer and/or mobile user terminal devices also are conventional in nature, and it is presumed that those skilled in the art are adequately familiar therewith.

Although FIGS. 9-11 in their present form show computers and user terminal devices, generally similar configurations also may be used within other elements of the lighting system 10. For example, one implementation of the brain, communication and interface elements of a lighting device, a standalone sensor or a user interface device may utilize an architecture similar to that of one of the computers or mobile terminals. As a more specific example, the personal computer type hardware in FIG. 10 (except for the keyboard, mouse and display) could serve as the brain and communication elements of a lighting device, where the input/output interface I/O would interface to an appropriate light driver and to any sensor(s) or other enhancement input or output device(s) included within the lighting device. As another example of use of an architecture similar to those of FIGS. 9-11 that may be utilized in a system like that of FIG. 1, a lighting controller or other user interface device (UI) might utilize an arrangement similar to the mobile device of FIG. 11, albeit possibly with only one transceiver compatible with the networking technology of the particular premises (e.g. to reduce costs).

For information about other examples of intelligent lighting devices, which may be suitable for use in a networked lighting system like that of FIG. 1, attention may be directed to U.S. Pat. No. 8,755,039 entitled "LIGHTING DEVICES WITH SENSORS FOR DETECTING ONE OR MORE EXTERNAL CONDITIONS AND NETWORKED SYSTEM USING SUCH DEVICES," the disclosure of which is entirely incorporated herein by reference.

As also outlined above, aspects of the autonomous commissioning procedure (e.g. of FIGS. 5-8), may be embodied in programming of the appropriate system elements. Program aspects of the technology discussed above therefore may be thought of as "products" or "articles of manufacture" typically in the form of executable code and/or associated data (software or firmware) that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software or firmware programming. All or portions of the programming may at times be communicated through the Internet or various other telecommunication networks. Such communications, for example, may enable loading of the software from one computer or processor into another, for example, from a management server or host computer 53 of the lighting system service provider into the computer platform of the CO 57 or into any of the lighting devices, sensors, user interface devices or third party devices. Thus, another type of media that may bear the software/firmware program elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A system, comprising:
  a data communication network;
  a plurality of lighting devices, each lighting device comprising:
    a communication interface coupled to the data communication network and configured to enable communication via the data communication network;
    a light source configured to produce visible light for general illumination of a space;
    a processor coupled to the light source and the communication interface, the processor configured to:
      manage operation of the light source to also transmit data via visible light communication; and
      communicate via the communication interface and the data communication network; and
    a sensor coupled to the processor, the sensor configured to:
      receive data via visible light communication; and
      deliver the received data to the processor; and
  a management function coupled to the data communication network, wherein:
    each processor of a respective lighting device is further configured to implement functions, including functions to:
      via the visible light communication, repeatedly transmit a data packet identifying the respective lighting device;
      receive, from each of some number of other lighting devices, a data packet count, each data packet count representing how many data packets identifying the respective lighting device are received by a single other lighting device via visible light communication;
      generate, based on the received data packet counts, a neighbor table defining neighbor relationships between the respective lighting device and one or more other lighting devices; and
      send the generated neighbor table to the management function; and
    the management function is configured to implement functions, including functions to:
      receive, from each respective lighting device, the neighbor table for the respective lighting device;
      create, based at least in part on the received neighbor tables, a logical map of the plurality of lighting devices;
      create a lighting system configuration in order to manage the plurality of lighting devices installed within the space, based at least in part on the created logical map; and
      store the created lighting system configuration.

2. The system of claim 1, wherein the function to generate the neighbor table further includes functions to:
  calculate, based on a data packet count representing how many data packets identifying the respective lighting device are received by the lighting device, a baseline for the lighting device;
  select a neighbor threshold; and
  determine, for each of the other lighting devices, whether the respective other lighting device is a neighbor of the respective lighting device based on:
    the received data packet count representing how many data packets identifying the respective lighting device are received by the respective other lighting device;
    the calculated baseline; and
    the selected neighbor threshold, further wherein:
  the baseline calculation function utilizes the formula $bLD_i = LD_iMrx_i / LD_iMtx_i$; and
  the respective other lighting device is a neighbor of the respective lighting device when the formula $PR_jMrx_i > bLD_i * n\%$ is true, wherein:
    i and j are integers;
    $LD_i$ is the $i^{th}$ respective lighting device;
    $PR_j$ is the $j^{th}$ respective other lighting device;
    Mtx is a transmitted data packet count;
    Mrx is received data packet count;
    $bLD_i$ is the baseline for the $i^{th}$ respective lighting device;
    $LD_iMrx_i$ is received data packet count representing how many data packets identifying the $i^{th}$ respective lighting device are received by the $i^{th}$ respective lighting device;
    $LD_iMtx_i$ is the transmitted data packet count for the $i^{th}$ respective lighting device;
    $PR_jMrx_i$ is received data packet count representing how many data packets identifying the $i^{th}$ respective lighting device are received by the $j^{th}$ respective other lighting device; and
    n is the selected neighbor threshold.

3. The system of claim 1, wherein the logical map creation function further includes functions to:
  based on the received neighbor tables, identify a logical location for each lighting device relative to one or more other lighting devices, wherein the logical location is a logical sub-network grouping between the lighting device and the one or more other lighting devices; and
  upon a number of indeterminate locations of lighting devices exceeding an allowable maximum and until the number of indeterminate locations of lighting devices is within the allowable maximum, repeatedly:
    for each lighting device, request an updated neighbor table based on a newly selected neighbor threshold;
    based on the updated neighbor tables, identify the logical location for each lighting device relative in relation to one or more other lighting devices; and
  create the logical map depicting the identified location for each lighting device.

* * * * *